US012738287B2

(12) United States Patent
Shi et al.

(10) Patent No.: US 12,738,287 B2
(45) Date of Patent: Sep. 15, 2026

(54) AUDIO DECODING METHOD, ELECTRONIC DEVICE, AND COMPUTER-READABLE STORAGE MEDIUM BASED ON LABEL INFORMATION VECTOR

(71) Applicant: TENCENT TECHNOLOGY (SHENZHEN) COMPANY LIMITED, Shenzhen (CN)

(72) Inventors: Yupeng Shi, Shenzhen (CN); Wei Xiao, Shenzhen (CN); Meng Wang, Shenzhen (CN); Yuyong Kang, Shenzhen (CN); Qingbo Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 204 days.

(21) Appl. No.: 18/643,717

(22) Filed: Apr. 23, 2024

(65) Prior Publication Data

US 2024/0274144 A1 Aug. 15, 2024

Related U.S. Application Data

(63) Continuation of application No. PCT/CN2023/092246, filed on May 5, 2023.

(30) Foreign Application Priority Data

Jun. 15, 2022 (CN) ........................ 202210676984.X

(51) Int. Cl.
*G10L 19/06* (2013.01)
*G10L 19/02* (2013.01)
(Continued)

(52) U.S. Cl.
CPC .......... *G10L 19/06* (2013.01); *G10L 19/0204* (2013.01); *G10L 21/02* (2013.01); *G10L 19/04* (2013.01)

(58) Field of Classification Search
CPC ..... G10L 19/02; G10L 19/0204; G10L 19/04; G10L 19/06; G10L 21/02; G10L 21/0208; G10L 21/0316; G10L 21/0324
(Continued)

(56) References Cited

U.S. PATENT DOCUMENTS 11,929,085 B2 * 3/2024 Biswas ............... G10L 21/0364
2005/0261897 A1 * 11/2005 Jelinek .................... G10L 19/20
704/E19.017

(Continued)

FOREIGN PATENT DOCUMENTS

AU 2020271965 A1 11/2021
CN 101202043 A 6/2008
(Continued)

OTHER PUBLICATIONS

Kolbălk, Morten, Zheng-Hua Tan, and Jesper Jensen. "Speech intelligibility potential of general and specialized deep neural network based speech enhancement systems." IEEE/ACM Transactions on Audio, Speech, and Language Processing 25.1, Jan. 2017, pp. 153-167. (Year: 2017).*

(Continued)

*Primary Examiner* — James S Wozniak
(74) *Attorney, Agent, or Firm* — Anova Law Group, PLLC

(57) ABSTRACT

Embodiments of this application provide an audio coding method and apparatus, an audio decoding method and apparatus, an electronic device, and a storage medium, applied to an on board scene. The audio decoding method includes obtaining a bitstream of an audio signal; performing label
(Continued)

extraction processing on a predicted value of a feature vector of the audio signal associated with the bitstream to obtain a label information vector, a dimension of the label information vector being the same as a dimension of the predicted value of the feature vector; performing signal reconstruction based on the predicted value of the feature vector and the label information vector; and identifying a predicted value of the audio signal obtained by the signal reconstruction as a decoding result of the bitstream.

19 Claims, 17 Drawing Sheets

(51) Int. Cl.
*G10L 19/04* (2013.01)
*G10L 21/02* (2013.01)

(58) Field of Classification Search
USPC .................................................. 704/500–501
See application file for complete search history.

(56) References Cited

U.S. PATENT DOCUMENTS

| | | | | |
|---|---|---|---|---|
| 2015/0179182 | A1 | 6/2015 | Vinton | |
| 2021/0166701 | A1 | 6/2021 | Lim et al. | |
| 2021/0327445 | A1* | 10/2021 | Biswas | G10L 21/0364 |
| 2021/0343301 | A1* | 11/2021 | Gao | G10L 19/06 |
| 2021/0343303 | A1* | 11/2021 | Gao | G10L 19/08 |
| 2022/0108681 | A1* | 4/2022 | Chang | G10L 19/00 |
| 2022/0148613 | A1 | 5/2022 | Xiao et al. | |
| 2022/0180881 | A1 | 6/2022 | Xiao et al. | |
| 2022/0223161 | A1* | 7/2022 | Fuchs | G10L 19/02 |
| 2023/0099343 | A1 | 3/2023 | Wang et al. | |
| 2023/0154474 | A1* | 5/2023 | Feng | G10L 19/167 704/500 |
| 2023/0298593 | A1* | 9/2023 | Ramos | G10L 21/0208 704/233 |
| 2024/0021210 | A1* | 1/2024 | Biswas | G06N 3/048 |
| 2024/0055006 | A1* | 2/2024 | Biswas | G10L 19/008 |
| 2025/0022477 | A1* | 1/2025 | Omran | G10L 19/038 |

FOREIGN PATENT DOCUMENTS

| | | | |
|---|---|---|---|
| CN | 101572586 | A | 11/2009 |
| CN | 108986835 | A | 12/2018 |
| CN | 113140225 | A | 7/2021 |
| CN | 113470667 | A | 10/2021 |
| CN | 113488063 | A | 10/2021 |
| CN | 113763973 | A | 12/2021 |
| CN | 113990347 | A | 1/2022 |
| CN | 114550732 | A | 5/2022 |
| CN | 115116451 | A | 9/2022 |
| WO | 2020208137 | A1 | 10/2020 |

OTHER PUBLICATIONS

Omran, Ahmed, et al. "Disentangling speech from surroundings in a neural audio codec." arXiv preprint ArXiv:2203.15578, Mar. 2022, pp. 1-5. (Year: 2022).*

Park, Se Rim, and Jinwon Lee. "A fully convolutional neural network for speech enhancement." arXiv preprint arXiv:1609.07132, Sep. 2016, pp. 1-6. (Year: 2016).*

Qi, Jun, et al. "Exploring deep hybrid tensor-to-vector network architectures for regression based speech enhancement." arXiv preprint arXiv:2007.13024, Aug. 2020, pp. 1-5. (Year: 2020).*

Xian, Yang, et al. "Convolutional fusion network for monaural speech enhancement." Neural Networks 143, Nov. 2021, pp. 97-107. (Year: 2021).*

Tan, Ke, et al. "Compressing deep neural networks for efficient speech enhancement." ICASSP 2021-2021 IEEE International Conference on Acoustics, Speech and Signal Processing (ICASSP). IEEE, 2021, pp. 8358-8362. (Year: 2021).*

The European Patent Office (EPO) The Extended European Search Report for Application No. 23822825.8, Jan. 21, 2025 8 Pages.

The World Intellectual Property Organization (WIPO) International Search Report for PCT/CN2023/092246 Aug. 7, 2023 7 Pages (including translation).

* cited by examiner

AUDIO DECODING METHOD, ELECTRONIC DEVICE, AND COMPUTER-READABLE STORAGE MEDIUM BASED ON LABEL INFORMATION VECTOR

RELATED APPLICATIONS

This application is a continuation of PCT Application No. PCT/CN2023/092246, filed on May 5, 2023, which claims priority to Chinese Patent Application No. 202210676984.X, filed on Jun. 15, 2022. The two applications are both incorporated herein by reference in their entirety.

FIELD OF THE TECHNOLOGY

This application relates to the field of communication technologies, and in particular, to an audio coding method and apparatus, an audio decoding method and apparatus, an electronic device, a computer-readable storage medium, and a computer program product.

BACKGROUND OF THE DISCLOSURE

Due to the convenience and timeliness of speech communication, voice calls are increasingly used in applications, such as transmitting audio signals (such as speech signals) between conference participants in an online meeting. In voice calls, the speech signals may be interfered with by acoustic interference such as noise. The noise mixed in the speech signals causes the call quality to deteriorate, greatly affecting the listening experience of a user.

However, in related art, there is no effective solution for how to enhance the speech signals to suppress the noise.

SUMMARY

Embodiments of this application provide an audio coding method and apparatus, an audio decoding method and apparatus, an electronic device, a computer-readable storage medium, and computer program product, capable of effectively suppressing acoustic interference in an audio signal, thereby improving quality of a reconstructed audio signal.

One aspect of this application provides an audio decoding method. The method includes obtaining a bitstream of an audio signal; performing label extraction processing on a predicted value of a feature vector of the audio signal associated with the bitstream to obtain a label information vector, a dimension of the label information vector being the same as a dimension of the predicted value of the feature vector; performing signal reconstruction based on the predicted value of the feature vector and the label information vector; and identifying a predicted value of the audio signal obtained by the signal reconstruction as a decoding result of the bitstream.

Another aspect of this application provides an electronic device. The electronic device includes a memory, configured to store computer-executable instructions; and a processor, configured to implement, when executing the computer-executable instructions stored in the memory, the audio coding method and the audio decoding method provided in embodiments of this application.

Another aspect of this application provides a non-transitory computer-readable storage medium, having computer-executable instructions stored thereon, the computer-executable instructions, when being executed by a processor, implementing the audio coding method and the audio decoding method provided in embodiments of this application.

In embodiments consistent with the present disclosure, label extraction processing is performed on a predicted value of a feature vector obtained by decoding to obtain a label information vector, and signal reconstruction is performed with reference to the predicted value of the feature vector and the label information vector. Accordingly, in comparison with signal reconstruction based on only the predicted value of the feature vector, because the label information vector only reflects core components in an audio signal, that is, the label information vector does not include acoustic interference such as noise, when signal reconstruction is performed with reference to the predicted value of the feature vector and the label information vector, the label information vector can be used for increasing a proportion of the core components in the audio signal to correspondingly reduce a proportion of acoustic interference such as noise, so that noise components included in the audio signal collected at the encoder side are effectively suppressed to achieve a signal enhancement effect, thereby improving the quality of a reconstructed audio signal.

DESCRIPTION OF EMBODIMENTS

Figure 1:
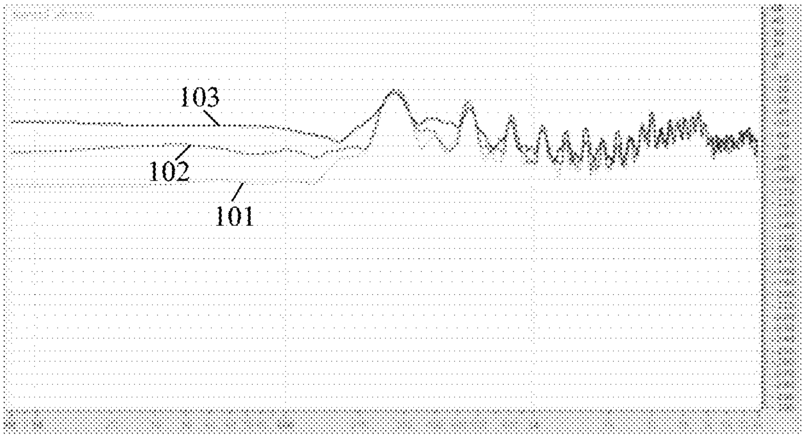
FIG. 1 is a schematic diagram of frequency spectrum comparison under different bit rates according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

It may be understood that in embodiments of this application, user information or other related data (for example, a speech signal sent by a user) is involved. When embodiments of this application are applied to specific products or technologies, permission or consent of users is required. Moreover, collection, use, and processing of the related data need to comply with related laws, regulations, and standards of related countries and regions.

In the following description, the terms "first", "second", and the like are merely intended to distinguish between similar objects rather than describe specific orders. It may be understood that the terms "first", "second", and the like may, where permitted, be interchangeable in a particular order or sequence, so that embodiments of this application described herein may be performed in an order other than that illustrated or described herein.

Unless otherwise defined, meanings of all technical and scientific terms used in this specification are the same as those usually understood by a person skilled in the art to which this application belongs. Terms used in the specification are merely intended to describe the objectives of embodiments of this application, but are not intended to limit this application.

Before embodiments of this application are further described in detail, a description is made on terms in embodiments of this application, and the terms in embodiments of this application are applicable to the following explanations.

(1) Neural Network (NN): It is an algorithmic mathematical model that imitates behavior features of animal neural networks and performs distributed parallel information processing. This network relies on complexity of a system and adjusts interconnected relationships between a large quantity of internal nodes to achieve a purpose of processing information.

(2) Deep Learning (DL): It is a new research direction in the field of machine learning (ML). Deep learning is to learn inherent laws and representation levels of sample data. Information obtained during these learning processes is of great help in interpretation of data such as words, images, and sounds. The ultimate objective of deep learning is to enable machines to have the same analytical learning capabilities as humans and to recognize data such as text, images, and sounds.

(3) Vector Quantization (VQ): It is an effective lossy compression technology based on Shannon's rate-distortion theory. A basic principle of vector quantization is to replace an input vector with an index of a codeword in a codebook that best matches the input vector for transmission and storage, and only a table lookup operation is needed during decoding.

(4) Scalar Quantization: It is quantization on a scalar, that is, one-dimensional vector quantization. A dynamic range is divided into a plurality of small intervals, and each small interval has a representative value. When an input signal falls into a specific interval, the input signal is quantized into the representative value.

(5) Entropy Coding: It is a lossless coding method that does not lose any information according to the entropy principle during a coding process. It is also a key module in lossy coding and is located at the end of an encoder. Common entropy coding includes Shannon coding, Huffman coding, Exp-Golomb coding, and arithmetic coding.

(6) Quadrature Mirror Filter (QMF) Bank: It is a filter pair including analysis-synthesis. A QMF analysis filter bank is used for sub-band signal decomposition to reduce signal bandwidth, so that each sub-band signal can be processed smoothly by a channel. A QMF synthesis filter bank is used for synthesizing sub-band signals recovered from a decoder side, for example, an original audio signal is reconstructed by zero-value interpolation, band-pass filtering, and the like.

Speech coding/decoding technology is a core technology in a communication service including remote audio and video calls. Speech coding technology uses less network bandwidth resources to transmit as much speech information as possible. From the perspective of Shannon information theory, speech coding is a kind of source coding. An objective of the source coding is to compress data volume that needs to transmit information as much as possible on an encoder side, remove redundancy in the information, and recover the information at a decoder side in a lossless (or nearly lossless) way.

Both compression rates of a speech encoder and a speech decoder provided in the related art can reach at least 10 times. To be specific, original speech data of 10 MB only needs 1 MB to be transmitted after being compressed by the encoder. This greatly reduces consumption of broadband resources needed to transmit information. For example, for a broadband speech signal having a sampling rate of 16000 Hz, if a 16-bit sampling depth is used, the bit rate of uncompressed version is 256 kilobits per second (kbps). If the speech coding technology is used, even for lossy coding, in a bit rate range from 10 kbps to 20 kbps, quality of a reconstructed speech signal can be close to the uncompressed version, and even sound is considered to be no difference. If a higher sampling rate service is needed, such as 32000 Hz ultra-wideband speech, the bit rate range needs to reach at least 30 kbps.

Conventional speech coding solutions provided in the related art can generally be divided into three types according to the coding principle: waveform speech coding, parametric speech coding, and hybrid speech coding.

The waveform speech coding is to directly code waveform of a speech signal. An advantage of this coding method is that the quality of coding speech is high, but a compression rate is not high.

Parametric speech coding refers to modeling a speech voicing process. What an encoder side needs to do is to extract a corresponding parameter of a to-be-transmitted speech signal. An advantage of the parametric speech coding is that the compression rate is extremely high, but a disadvantage is that quality of recovering speech is not high.

The hybrid speech coding combines the foregoing two coding methods, and uses parameters to represent speech components on which the parametric speech coding can be used. The waveform speech coding is used on the remaining components that cannot be effectively expressed by parameters. The combination of the two coding methods can achieve high coding efficiency and high quality of recovered speech.

Generally, the foregoing three coding principles are derived from classic speech signal modeling, also known as signal processing-based compression methods. Based on rate-distortion analysis and in combination with standardization experience over the past few decades, a bit rate of at least 0.75 bit/sample is recommended to provide ideal speech quality. For a wideband speech signal having a sampling rate of 16000 Hz, a bit rate is equivalent to 12 kbps. For example, the IETF OPUS standard recommends 16 kbps as a recommended bit rate for providing high-quality broadband voice calls.

For example, FIG. 1 is a schematic diagram of frequency spectrum comparison under different bit rates according to an embodiment of this application, to demonstrate a relationship between compression bit rate and quality. A curve 101 is original speech, that is, an uncompressed audio signal. A curve 102 is of an effect of an OPUS encoder at 20 kbps. A curve 103 is of an effect of the OPUS encoder at 6 kbps. It can be learned from FIG. 1 that as a bit rate increases, a compressed signal becomes closer to the original signal.

However, according to the foregoing solution provided in the related art, it is difficult to significantly reduce the bit rate while maintaining the existing quality.

In recent years, with the advancement of deep learning, the related art has also provided solutions for using artificial intelligence to reduce the bit rate.

However, for an audio coding/decoding solution based on artificial intelligence, although the bit rate can be lower than 2 kbps, generation networks such as Wavenet are generally invoked, resulting in very high complexity on a decoder side, making the generation networks very challenging to use in a mobile terminal. Moreover, the quality achieved is also significantly inferior to that of a conventional signal processing encoder. For an end-to-end NN-based coding/decoding solution, the bit rate is from 6 kbps to 10 kbps, and subjective quality is close to that of a conventional signal processing solution. However, deep learning networks are used at both encoder side and decoder side, resulting in very high complexity encoding/decoding.

In addition, whether it is a conventional signal processing solution or a deep neural network-based solution, only a speech signal can be compressed. However, actual speech communication is affected by acoustic interference such as noise. In other words, there is no solution in the related art that has both speech enhancement and a low bit rate and high quality compression effect.

In view of this, embodiments of this application provide an audio coding method and apparatus and an audio decoding method and apparatus, an electronic device, a computer-readable storage medium, and computer program product, capable of effectively suppressing acoustic interference in an audio signal while improving coding efficiency, thereby improving quality of a reconstructed audio signal. The following describes applications of the electronic device provided in embodiments of this application. The electronic device provided in embodiments of this application may be implemented as a terminal device, may be implemented as a server, or may be implemented collaboratively by a terminal device and a server. The following is an example of the audio coding method and the audio decoding method provided in embodiments of this application being implemented collaboratively by a terminal device and a server.

Figure 2:
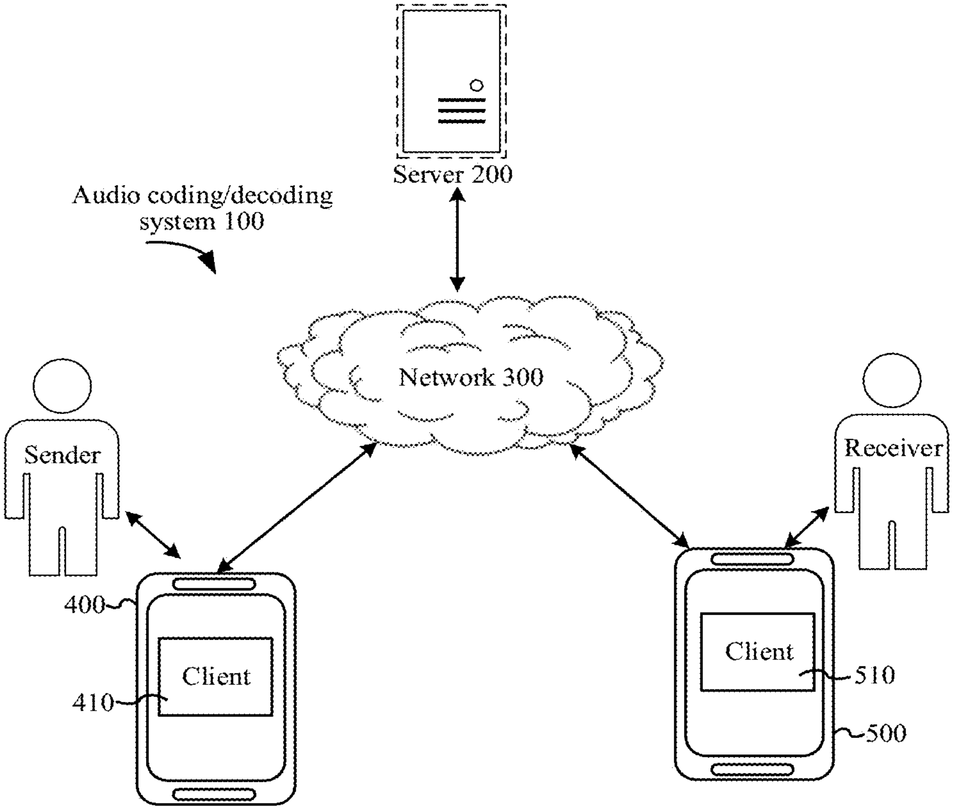
FIG. 2 is a schematic diagram of an architecture of an audio coding and decoding system 100 according to an embodiment of this application.

For example, FIG. 2 is a schematic diagram of an architecture of an audio coding and decoding system 100 according to an embodiment of this application. To support an application that can effectively suppress acoustic interference in an audio signal while improving coding efficiency, and thereby improving quality of a reconstructed audio signal, as shown in FIG. 2, the audio coding and decoding system 100 includes: a server 200, a network 300, a first terminal device 400 (that is, an encoder side), and a second terminal device 500 (that is, a decoder side). The network 300 may be a local area network, a wide area network, or a combination thereof.

In some embodiments, a client 410 runs on the first terminal device 400. Client 410 may be various types of clients, for example, including an instant messaging client, a network conferencing client, a livestreaming client, and a browser. In response to an audio collection instruction triggered by a sender (such as an initiator of an online meeting, a streamer, or an initiator of a voice call), the client 410 invokes a microphone in the terminal device 400 to collect an audio signal, and codes the collected audio signal to obtain a bitstream. Then, the client 410 can send the bitstream to the server 200 via the network 300, so that the server 200 sends the bitstream to the second terminal device 500 associated with a receiver (such as a participant in an online meeting, an audience, or a recipient of a voice call). After receiving the bitstream sent by server 200, a client 510 can decode the bitstream to obtain a predicted value (also referred to as an estimated value) of a feature vector of the audio signal. Then, the client 510 can further invoke an enhancement network to perform label extraction processing on the predicted value of the feature vector to obtain a label information vector used for signal enhancement, a dimension of the label information vector being the same as a dimension of the predicted value of the feature vector. Next, the client 510 can invoke, based on the predicted value of the feature vector obtained by decoding and the label information vector obtained by the label extraction processing, a synthesis network for signal reconstruction, to obtain a predicted value of the audio signal, so that audio signal reconstruction is completed and noise components included in the audio signal collected at the encoder side are suppressed, thereby improving the quality of the reconstructed audio signal.

The audio coding method and the audio decoding method provided in embodiments of this application can be widely used in various types of voice or video call application scenarios, such as on board voice implemented by an application running on an on board terminal, a voice call or a video call by an instant messaging client, a voice call in a game application, or a voice call in a network conferencing client. For example, speech enhancement can be performed at a receiving end of a voice call or a server that provides a speech communication service according to the audio decoding method provided in embodiments of this application.

A online meeting scenario is used as an example. A online meeting is an important link in online office. In the online meeting, after a voice collection device (such as a microphone) of a participant in the online meeting collects a speech signal of a speaker, the collected speech signal needs to be sent to other participants in the online meeting. This process includes transmission and playback of the speech signal between a plurality of participants. If noise mixed in the speech signal is not processed, auditory experience of the conference participants is greatly affected. In this scenario, the audio decoding method provided in embodiments of this application can be used to enhance the speech signal in the online meeting, so that the speech signal heard by the conference participants is an enhanced speech signal. In other words, in a reconstructed speech signal, noise components in the speech signal collected at an encoder side are suppressed, thereby improving quality of a voice call in the online meeting.

In some other embodiments, embodiments of this application may be implemented with the help of the cloud technology. Cloud technology refers to hosting technology that integrates resources such as hardware, software, and networks in a wide area network or a local area network, to implement data computing, storage, processing, and sharing.

The cloud technology is a general term of network technologies, information technologies, integration technologies, management platform technologies, application technologies, and other technologies applied to a cloud computing business model, and creates a resource pool to satisfy what is needed in a flexible and convenient manner. Cloud computing technology may be a backbone. A service interaction function between the foregoing servers 200 can be implemented based on cloud technology.

For example, the server 200 shown in FIG. 2 may be an independent physical server, a server cluster or distributed system composed of a plurality of physical servers, or a cloud server providing basic cloud computing services, such as cloud services, cloud databases, cloud computing, cloud functions, network services, cloud communications, middleware services, domain name services, security services, content delivery networks (CDN), and big data and artificial intelligence platforms. The terminal device 400 and the terminal device 500 shown in FIG. 2 may be a smartphone, a tablet computer, a notebook computer, a desktop computer, a smart speaker, a smartwatch, an on board terminal, or the like, but is not limited thereto. The terminal device (such as the first terminal device 400 and the second terminal device 500) and the server 200 may be connected directly or indirectly by wired or wireless communication, and this is not limited to embodiments of this application.

In some embodiments, the terminal device (such as the second terminal device 500) or the server 200 may implement the audio decoding method provided in embodiments of this application by running a computer program. For example, the computer program may be a native program or a software module in an operating system, may be a native application (APP), that is, a program that needs to be installed in the operating system to run, such as a livestreaming APP, a network conferencing APP, or an instant messaging APP, or may be a small program, that is, a program that only needs to be downloaded to a browser environment to run. In summary, the foregoing computer program may be any form of application, module, or plug-in.

Figure 3:
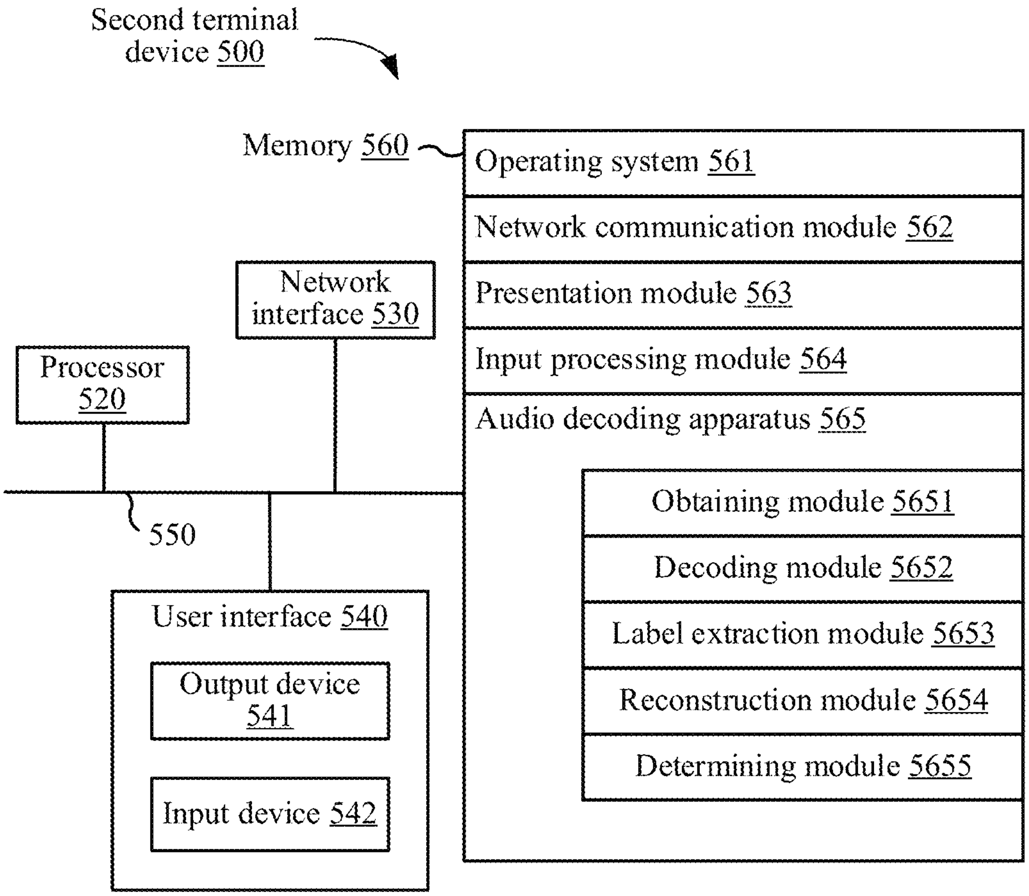
FIG. 3 is a schematic diagram of the structure of a second terminal device 500 according to an embodiment of this application.

The following continues to describe a structure of the second terminal device 500 shown in FIG. 2. FIG. 3 is a schematic diagram of the structure of a second terminal device 500 according to an embodiment of this application. The second terminal device 500 shown in FIG. 3 includes: at least one processor 520, a memory 560, at least one network interface 530, and a user interface 540. Components in the second terminal device 500 are coupled together by using a bus system 550. It may be understood that the bus system 550 is configured to implement connection and communication between the components. In addition to a data bus, the bus system 550 further includes a power bus, a control bus, and a state signal bus. However, for ease of clear description, all types of buses in FIG. 3 are marked as the bus system 550.

The processor 520 may be an integrated circuit chip with a signal processing capability, for example, a general-purpose processor, a digital signal processor (DSP), another programmable logic device, a discrete gate or a transistor logic device, or a discrete hardware component. The general-purpose processor may be a microprocessor, any conventional processor, or the like.

The user interface 540 includes one or more output devices 541 that enable presentation of media content. The output device 541 includes one or more speakers and/or one or more visual displays. The user interface 540 further includes one or more input apparatuses 542 including a user interface component that facilitates user input, for example, a keyboard, a mouse, a microphone, a touch screen display, a camera, and another input button and control.

The memory 560 may be removable, non-removable, or a combination thereof. An example hardware device includes a solid-state memory, a hard disk drive, a DVD-ROM/CD-ROM drive, and the like. In one embodiment, the memory 560 includes one or more storage devices physically located away from the processor 520.

Memory 560 may include a volatile memory or a non-volatile memory, or may include both a volatile memory and a non-volatile memory. The non-volatile memory may be a read-only memory (ROM), and the volatile memory may be a random-access memory (RAM). The memory 560 described in embodiments of this application aims to include any suitable type of memory.

In some embodiments, memory 560 can store data to support various operations, examples of the data include programs, modules, and data structures, subsets, or supersets thereof. An example is as follows.

An operating system 561 includes system programs for handling various basic system services and performing hardware-related tasks, for example, a frame layer, a core library layer, and a drive layer, used for implementing various basic services and processing hardware-based tasks.

A network communication module 562 is configured to reach another computing device via one or more (which are wired or wireless) network interfaces 530. An example network interface 530 includes: Bluetooth, wireless fidelity (Wi-Fi), a universal serial bus (USB), and the like.

A presentation module 563 is configured to enable presentation of information via one or more output devices 541 (for example, display screens and speakers) associated with the user interface 540 (for example, a user interface for operating a peripheral device and displaying content and information);

An input processing module 564 is configured to detect one or more users enters or interactions from one or more input apparatuses 542 and translate the detected inputs or interactions.

In some embodiments, the audio decoding apparatus provided in embodiments of this application may be implemented by software components. FIG. 3 shows an audio decoding apparatus 565 stored in the memory 560, which may be software in a form of a program and a plug-in, and includes the following software modules: an obtaining module 5651, a decoding module 5652, a label extraction module 5653, a reconstruction module 5654, and a determining module 5655. These modules are logical and therefore can be arbitrarily combined or further split based on implemented functions. The following describes the functions of each module.

The following describes the audio coding method and the audio decoding method provided in embodiments of this application in detail with reference to applications of the terminal device provided in embodiments of this application.

Figure 4A:
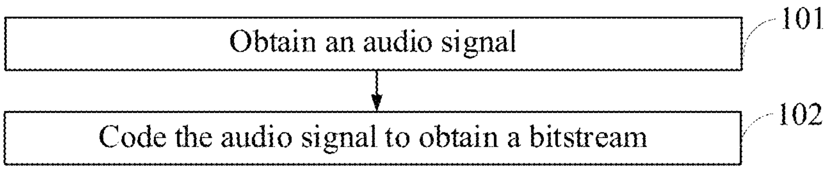
FIG. 4A is a schematic flowchart of an audio coding method according to an embodiment of this application.

For example, FIG. 4A is a schematic flowchart of an audio coding method according to an embodiment of this application. As shown in FIG. 4A, main steps performed at an encoder side include Step 101: Obtain an audio signal. Step 102: Code the audio signal to obtain a bitstream.

Figure 4B:
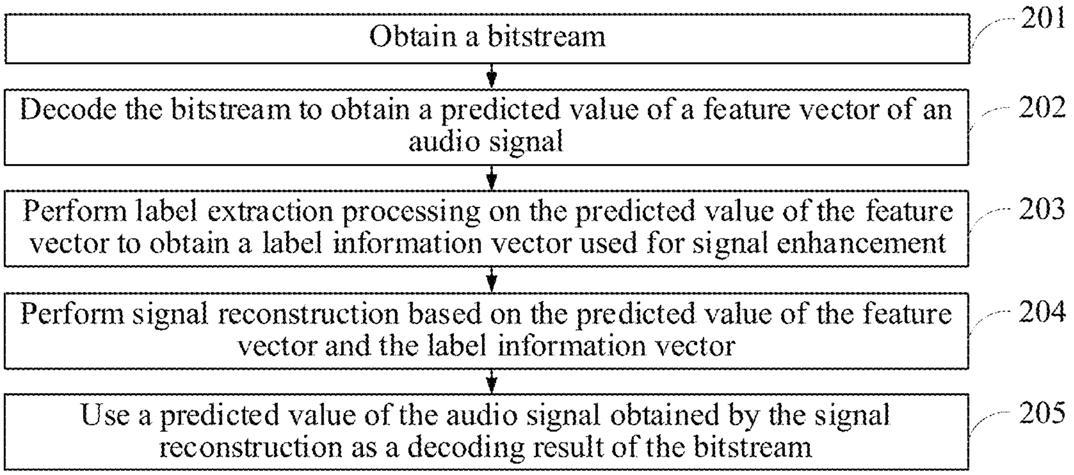
FIG. 4B is a schematic flowchart of an audio decoding method according to an embodiment of this application.

For example, FIG. 4B is a schematic flowchart of an audio decoding method according to an embodiment of this application. As shown in FIG. 4B, main steps performed at a decoder side include Step 201: Obtain a bitstream. Step 202: Decode the bitstream to obtain a predicted value of a feature vector of an audio signal. Step 203: Perform label extraction processing on the predicted value of the feature vector to obtain a label information vector. Step 204: Perform signal reconstruction based on the predicted value of the feature vector and the label information vector. Step 205: Use a predicted value of the audio signal obtained by the signal reconstruction as a decoding result of the bitstream.

The following uses a conference system based on Voice over Internet Protocol (VOIP) as an example. From the perspective of interaction between a first terminal device (that is, an encoder side), a server, and a second terminal device (that is, a decoder side), the audio coding method and the audio decoding method provided in embodiments of this application are described in detail.

Figure 4C:
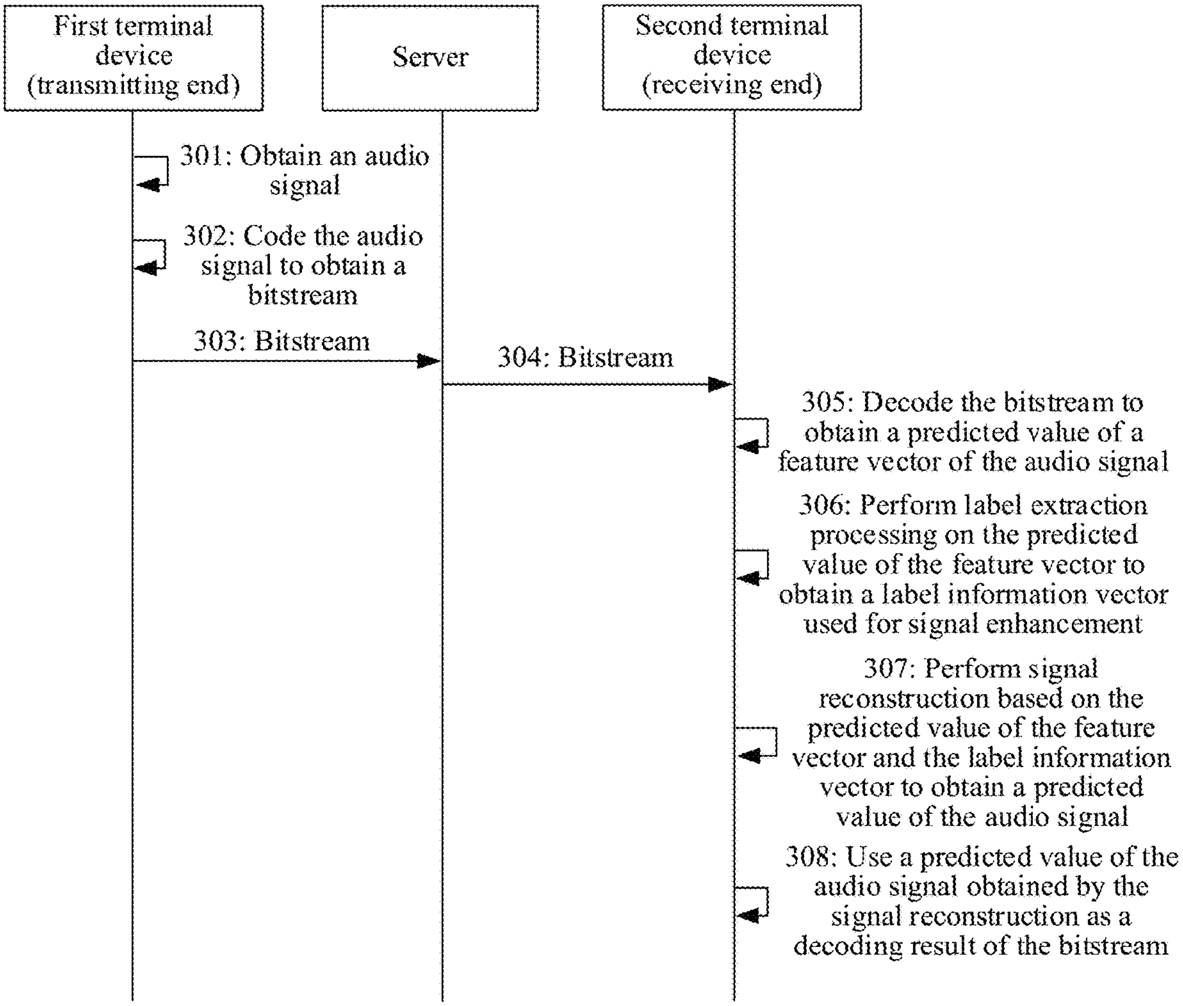
FIG. 4C is a schematic flowchart of an audio coding method and an audio decoding method according to an embodiment of this application.

For example, FIG. 4C is a schematic flowchart of an audio coding method and an audio decoding method according to an embodiment of this application. A description is carried out with reference to steps shown in FIG. 4C.

Steps performed by the terminal device may be performed by a client running on the terminal device. For ease of description, embodiments of this application do not make a specific distinction between the terminal device and the client running on the terminal device. In addition, the audio coding method and the audio decoding method provided in embodiments of this application may be performed by various forms of computer programs running on the terminal device but is not limited to being performed by the client running on the terminal device, or may be performed by the foregoing operating system 561, software module, script, or small program. Therefore, an example of the client below is not to be regarded as limiting embodiments of this application.

Before describing FIG. 4C, structures of the encoder side and the decoder side are described first.

Figure 5:
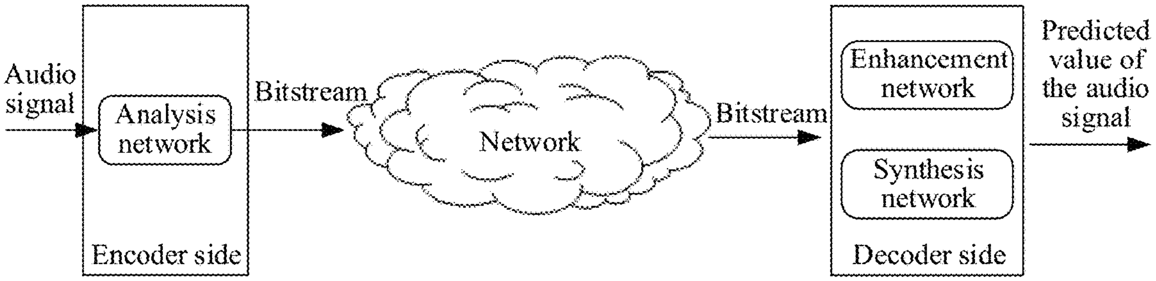
FIG. 5 is a schematic diagram of structures of an encoder side and a decoder side according to an embodiment of this application.

For example, FIG. 5 is a schematic diagram of structures of an encoder side and a decoder side according to an embodiment of this application. As shown in FIG. 5, the encoder side includes an analysis network, which is used for performing feature extraction processing on an input audio signal to obtain a feature vector of the audio signal. Then, quantization coding processing is performed on the feature vector of the audio signal to obtain a bitstream. The decoder side includes an enhancement network and a synthesis network. After the received bitstream is decoded and a predicted value of the feature vector of the audio signal is obtained, the enhancement network can be invoked to perform label extraction processing on the predicted value of the feature vector of the audio signal to obtain a label information vector, and then the synthesis network can be invoked, based on the label information vector and the predicted value of the feature vector, for signal reconstruction to obtain a predicted value of the audio signal.

The following describes the audio coding method and the audio decoding method provided in embodiments of this application in detail with reference to the foregoing structures of the encoder side and the decoder side.

Step 301: A first terminal device obtains an audio signal.

In some embodiments, in response to an audio collection instruction triggered by a user, the first terminal device invokes an audio collection device (such as a built-in microphone or an external microphone in the first terminal device) to collect an audio signal to obtain the audio signal, which may be a speech signal of a speaker in an online meeting scenario, a speech signal of a streamer in a livestreaming scenario, or the like.

Using the online meeting scenario is used as an example, when an online meeting APP running on the first terminal device receives a click/tap operation of the user (such as an initiator of the online meeting) on an "Open Microphone" button displayed in a human-computer interaction interface, a microphone (or microphone array) provided by the first terminal device is invoked to collect the speech signal sent by the user, to obtain the speech signal of the initiator of the online meeting.

Step 302: The first terminal device codes the audio signal to obtain a bitstream.

In some embodiments, after invoking the microphone to collect the audio signal, the first terminal device may code the audio signal to obtain the bitstream in the following manner. First, an analysis network (such as a neural network) is invoked to perform feature extraction processing on the audio signal to obtain a feature vector of the audio signal. Then, the feature vector of the audio signal is quantized (such as vector quantization or scalar quantization) to obtain an index value of the feature vector. Finally, the index value of the feature vector is coded, for example, performing entropy coding on the index value of the feature vector, to obtain the bitstream.

For example, the foregoing vector quantization refers to a process of coding points in vector space with a limited subset thereof. In vector quantization coding, the key is establishment of a codebook (or quantization table) and a search algorithm of a codeword. After the feature vector of the audio signal is obtained, a codebook can be queried first for the codeword that best matches the feature vector of the audio signal, and then an index value of the codeword obtained by the query is used as the index value of the feature vector. In other words, the index value of the codeword in the codebook that best matches the feature vector of the audio signal is used to replace the feature vector of the audio signal for transmission and storage.

For example, the foregoing scalar quantization refers to one-dimensional vector quantization. An entire dynamic range is divided into a plurality of small intervals, and each small interval has a representative value. During quantization, a signal value falling into the small interval is replaced by the entire representative value, or is quantized to this representative value. A signal in this case is one-dimensional, so that the quantization is referred to as scalar quantization. For example, assuming that the feature vector of the audio signal falls into a small interval 2, a representative value corresponding to the small interval 2 can be used as the index value of the feature vector.

For example, the first terminal device can perform feature extraction processing on the audio signal to obtain the feature vector of the audio signal in the following manner. First, convolution processing (such as causal convolution processing) is performed on the audio signal to obtain a convolution feature of the audio signal. Next, pooling processing is performed on the convolution feature of the audio signal to obtain a pooled feature of the audio signal. Then, the pooled feature of the audio signal is downsampled to obtain a downsampled feature of the audio signal. Finally, convolution processing is performed on the downsampled feature of the audio signal to obtain the feature vector of the audio signal.

For example, the objective of the foregoing pooling processing is dimension reduction. After a convolutional layer, a dimension of a feature output by the convolutional layer is reduced by pooling, to reduce the overfitting phenomenon during reducing network parameters and calculation costs. The pooling includes max pooling and average pooling. The max pooling refers to taking a point having the largest value in a local receptive field, that is, reducing data volume based on the maximum value. The average pooling refers to taking the average of values in the local receptive field.

In some other embodiments, the first terminal device may further code the audio signal to obtain the bitstream in the following manner. A collected audio signal is decomposed, for example, it is decomposed by two-channel QMF analysis filter bank to obtain a low-frequency sub-band signal and a high-frequency sub-band signal. Then, feature extraction processing is performed on the low-frequency sub-band signal and the high-frequency sub-band signal, respectively, to correspondingly obtain a feature vector of the low-frequency sub-band signal and a feature vector of the high-frequency sub-band signal. Then, quantization coding is performed on the feature vector of the low-frequency sub-band signal to obtain a low-frequency bitstream of the audio signal. Quantization coding is performed on the feature vector of the high-frequency sub-band signal to obtain a high-frequency bitstream of the audio signal. Accordingly, the audio signal is first decomposed, and then the quantization coding is performed respectively on the low-frequency sub-band signal and the high-frequency sub-band signal obtained by the decomposition, to effectively reduce information loss caused by compression.

For example, the first terminal device can decompose the audio signal to obtain the low-frequency sub-band signal and the high-frequency sub-band signal in the following manner. First, the audio signal is sampled to obtain a sampled signal. The sampled signal includes a plurality of collected sample points. Next, low-pass filtering processing is performed on the sampled signal to obtain a low-pass filtered signal. Then, the low-pass filtered signal is downsampled to obtain the low-frequency sub-band signal. Similarly, high-pass filtering processing is performed on the sampled signal to obtain a high-pass filtered signal, and the high-pass filtered signal is downsampled to obtain the high-frequency sub-band signal.

In the foregoing low-pass filtering, a rule is that low-frequency signals can pass normally, while high-frequency signals that exceed a set threshold are blocked and weakened. The low-pass filtering can be thought of as: A frequency point is set, and when a signal frequency is higher than this frequency, the signal cannot pass. For a digital signal, this frequency point is also a cut-off frequency. When a frequency domain is higher than this cut-off frequency, all values are assigned to 0. Because all low-frequency signals are allowed to pass in this process, the process is referred to as low-pass filtering.

In the foregoing high-pass filtering, a rule is that high-frequency signals can pass normally, while low-frequency signals below a set threshold are blocked and weakened. The high-pass filtering can be thought of as: A frequency point is set, and when a signal frequency is lower than this frequency, the signal cannot pass. For a digital signal, this frequency point is also referred to as a cut-off frequency. When a frequency domain is lower than this cut-off frequency, all values are assigned to 0. Because all high-frequency signals are allowed to pass in this process, the process is referred to as high-pass filtering.

The foregoing downsampling processing is a method of reducing a quantity of sampling points. The downsampling processing can be performed by taking values at intervals to obtain a low-frequency sub-band signal. For example, for a plurality of sampled signals included in the low-pass filtered signal, selection can be performed once every three bits, that is, a first bit sampled signal, a fourth bit sampled signal, a seventh bit sampled signal, and the like are selected, to obtain low-frequency sub-band signals.

In some embodiments, the first terminal device may further code the audio signal to obtain the bitstream in the following manner. First, a collected audio signal is decomposed to obtain N sub-band signals. N is an integer greater than 2. Next, feature extraction processing is performed on each sub-band signal to obtain feature vectors of the sub-band signals. For example, for each sub-band signal obtained by the decomposition, a neural network model can be invoked to perform feature extraction processing to obtain a feature vector of the sub-band signal. Then, quantization coding is performed on the feature vectors of the sub-band signals respectively to obtain N sub-bitstreams.

For example, the foregoing decomposition processing on the collected audio signal to obtain the N sub-band signals can be implemented in the following manner. The decomposition processing can be performed by four-channel QMF analysis filter bank to obtain four sub-band signals. The low-pass filtering and high-pass filtering can be performed on the audio signal to obtain a low-frequency sub-band signal and a high-frequency sub-band signal. Then, low-pass filtering, and high-pass filtering can be performed again on the low-frequency sub-band signal to correspondingly obtain sub-band signal 1 and sub-band signal 2. Similarly, low-pass filtering, and high-pass filtering can be performed again on the high-frequency sub-band signal obtained by decomposition to correspondingly obtain sub-band signal 3 and sub-band signal 4. Accordingly, two layers of 2-channel QMF analysis filtering are iterated to decompose the audio signal into four sub-band signals.

Step 303: The first terminal device sends the bitstream to a server.

In some embodiments, after coding the collected audio signal to obtain the bitstream, the first terminal device can send the bitstream to the server via a network.

Step 304: The server sends the bitstream to a second terminal device.

In some embodiments, after receiving the bitstream sent by the first terminal device (that is, the encoder side, such as a terminal device associated with an initiator of an online meeting), the server can send the bitstream to the second terminal device (that is, the decoder side, such as a terminal device associated with a participant of the online meeting) via a network.

In some other embodiments, considering forward compatibility, a transcoder can be deployed in the server to resolve an interconnection problem between a new encoder (which is an encoder that codes based on artificial intelligence, such as an NN encoder) and a conventional encoder (which is an encoder that codes based on transformation of time domain and frequency domain, such as a G.722 encoder). For example, if a new NN encoder is deployed in the first terminal device (that is, a transmitting end), and a conventional decoder (such as a G.722 decoder) is deployed in the second terminal device (that is, a receiving end), the second terminal device cannot correctly decode the bitstream sent by the first terminal device. For the foregoing situation, the transcoder can be deployed in the server. For example, after receiving the bitstream that is coded based on the NN encoder and that is sent by the first terminal device, the server can first invoke the NN decoder to generate an audio signal, and then invoke the conventional encoder (such as a G.722 encoder) to generate a specific bitstream. Accordingly, the second terminal device can decode correctly. In other words, a problem that the decoder side cannot decode correctly due to inconsistent versions of the encoder deployed on the encoder side and the decoder deployed on the decoder side can be avoided, thereby improving compatibility in a coding and decoding process.

Step 305: The second terminal device decodes the bitstream to obtain a predicted value of a feature vector of the audio signal.

In some embodiments, the second terminal device can implement step 305 in the following manner. First, the bitstream is decoded to obtain an index value of the feature vector of the audio signal. Then, a quantization table is queried based on the index value to obtain the predicted value of the feature vector of the audio signal. For example, when the encoder side uses an index value of a codeword in the quantization table that best matches the feature vector of the audio signal to replace the feature vector for subsequent coding, after decoding the bitstream to obtain the index value, the decoder side can perform a table lookup operation based on the index value to obtain the predicted value of the feature vector of the audio signal.

Decoding processing and encoding processing are inverse processes. For example, when the encoder side uses entropy coding to code the feature vector of the audio signal to obtain the bitstream, the decoder side can correspondingly use entropy decoding to decode the received bitstream to obtain the index value of the feature vector of the audio signal.

In some other embodiments, when the bitstream includes a low-frequency bitstream and a high-frequency bitstream, the second terminal device can further implement the foregoing step 305 in the following manner. The low-frequency bitstream is decoded to obtain a predicted value of a feature vector of the low-frequency sub-band signal. The high-frequency bitstream is decoded to obtain a predicted value of a feature vector of the high-frequency sub-band signal. The low-frequency bitstream is obtained by coding the low-frequency sub-band signal obtained by decomposing the audio signal, and the high-frequency bitstream is obtained by coding the high-frequency sub-band signal obtained by decomposing the audio signal. The low frequency bitstream is used as an example. When the encoder side uses entropy coding to code the feature vector of the low-frequency sub-band signal, the decoder side can use corresponding entropy decoding to decode the low-frequency bitstream.

For example, for the low-frequency bitstream, the second terminal device can first decode the low-frequency bitstream to obtain an index value (which is assumed to be index value 1) of the feature vector of the low-frequency sub-band signal, and then query the quantization table based on index value 1 to obtain the predicted value of the feature vector of the low-frequency sub-band signal. Similarly, for the high-frequency bitstream, the second terminal device can first decode the high-frequency bitstream to obtain an index value (which is assumed to be an index value 2) of the feature vector of the high-frequency sub-band signal, and then query the quantization table based on the index value 2 to obtain the predicted value of the feature vector of the high-frequency sub-band signal.

In some embodiments, when the bitstream includes N sub-bitstreams, the N sub-bitstreams corresponding to different frequency bands and being obtained by coding the N sub-band signals obtained by decomposing the audio signal, and N being an integer greater than 2, the second terminal device can further implement the foregoing step 305 in the following manner. The N sub-bitstreams are decoded respectively to obtain predicted values of feature vectors corresponding to the N sub-band signals, respectively. A decoding process for the N sub-bitstreams here can be implemented with reference to the foregoing decoding process for the low-frequency bitstream or the high-frequency bitstream. Details are not described again in embodiments of this application.

For example, that the N sub-bitstreams are four sub-bitstreams, namely sub-bitstream 1, sub-bitstream 2, sub-bitstream 3, and sub-bitstream 4 is used as an example. Sub-bitstream 1 is obtained by coding sub-band signal 1, sub-bitstream 2 is obtained by coding sub-band signal 2, sub-bitstream 3 is obtained by coding sub-band signal 3, and sub-bitstream 4 is obtained by coding sub-band signal 4. After receiving these four sub-bitstreams, the second terminal device can decode the four sub-bitstreams respectively to correspondingly obtain predicted values of feature vectors corresponding to the four sub-band signals, for example, including a predicted value of a feature vector of sub-band signal 1, a predicted value of a feature vector of sub-band signal 2, a predicted value of a feature vector of sub-band signal 3, and a predicted value of a feature vector of sub-band signal 4.

Step 306: The second terminal device performs label extraction processing on the predicted value of the feature vector to obtain a label information vector.

The label information vector is used for signal enhancement. In addition, the dimension of the label information vector is the same as a dimension of the predicted value of the feature vector. Accordingly, during subsequent signal reconstruction, the predicted value of the feature vector and the label information vector can be spliced to achieve a signal enhancement effect of a reconstructed audio signal by increasing a proportion of core components. In other words, the predicted value of the feature vector and the label information vector are combined for signal reconstruction to enable all core components in the reconstructed audio signal to be enhanced, thereby improving quality of the reconstructed audio signal.

In some embodiments, the second terminal device can perform label extraction processing on the predicted value of the feature vector by invoking an enhancement network to obtain the label information vector. The enhancement network includes a convolutional layer, a neural network layer, a full-connection network layer, and an activation layer. The following describes a process of extracting the label information vector with reference to the foregoing structure of the enhancement network.

Figure 6A:
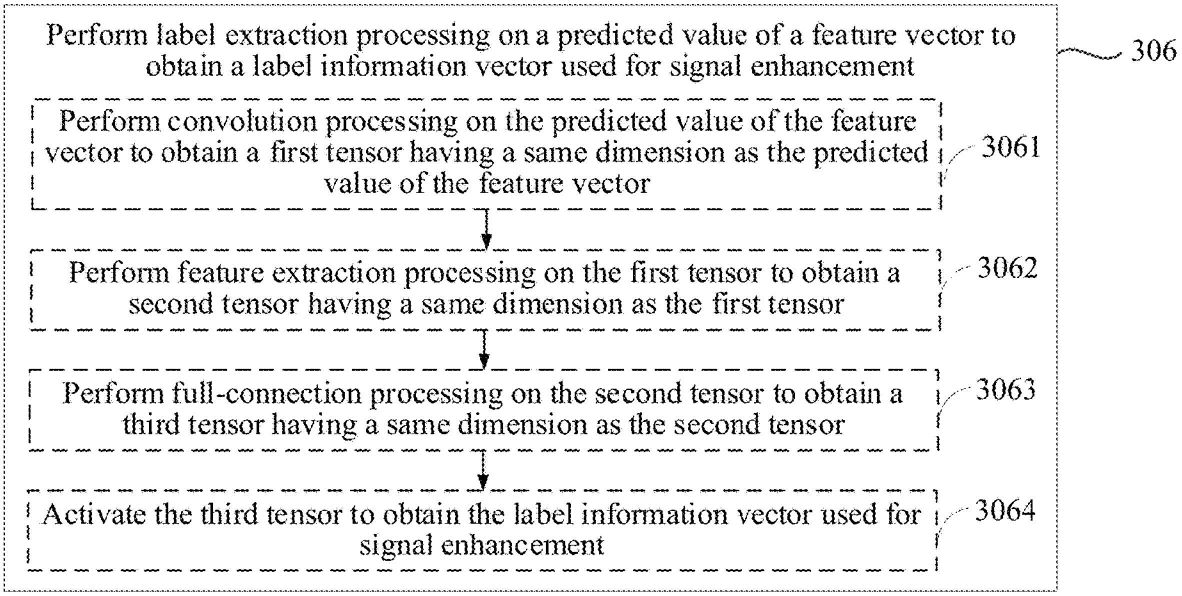
FIG. 6A and FIG. 6B are schematic flowcharts of an audio decoding method according to an embodiment of this application.

For example, FIG. 6A is a schematic flowchart of an audio decoding method according to an embodiment of this application. As shown in FIG. 6A, step 306 shown in FIG. 4C can be implemented by step 3061 to step 3064 shown in FIG. 6A. A description is carried out with reference to the steps shown in FIG. 6A.

Step 3061: The second terminal device performs convolution processing on the predicted value of the feature vector to obtain a first tensor having the same dimension as the predicted value of the feature vector.

Figure 13:
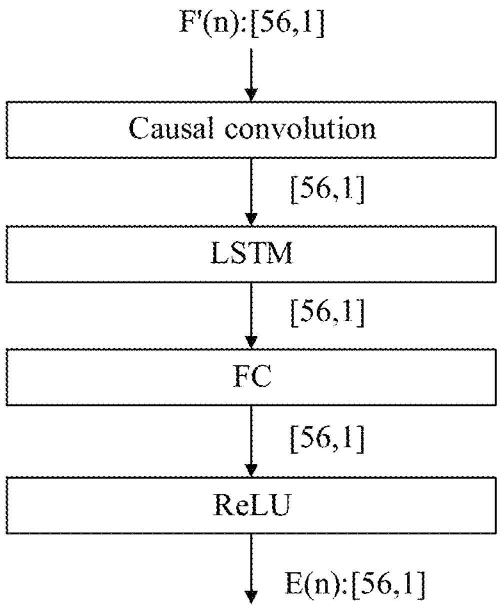
FIG. 13 is a schematic diagram of a structure of an enhancement network according to an embodiment of this application.

In some embodiments, the second terminal device can use the predicted value of the feature vector obtained in step 305 as input, invoke the convolutional layer (for example, a one-dimensional causal convolution) included in the enhancement network, and generate the first tensor (where a tensor is a quantity that includes values in a plurality of dimensions) having the same dimension as the predicted value of the feature vector. For example, as shown in FIG. 13, the dimension of the predicted value of the feature vector is 56×1, and after causal convolution processing, a tensor of 56×1 is generated.

Step 3062: The second terminal device performs feature extraction processing on the first tensor to obtain a second tensor having a same dimension as the first tensor.

In some embodiments, by using the neural network layer (such as a long short-term memory network and a temporal recurrent neural network) included in the enhancement network, feature extraction processing can be performed on the first tensor obtained by causal convolution processing, to generate the second tensor having the same dimension as the first tensor. For example, as shown in FIG. 13, the dimension of the first tensor is 56×1, and after a layer of long short-term memory (LSTM) network performs feature extraction processing, a tensor of 56×1 is generated.

Step 3063: The second terminal device performs full-connection processing on the second tensor to obtain a third tensor having the same dimension as the second tensor.

In some embodiments, after the second tensor having the same dimension as the first tensor is obtained by feature extraction processing using the neural network layer included in the enhancement network, the second terminal device can invoke the full-connection network layer included in the enhancement network to perform full-connection processing on the second tensor to obtain the third tensor having the same dimension as the second tensor. For example, as shown in FIG. 13, the dimension of the second tensor is 56×1, and after the full-connection network layer is invoked to perform full-connection processing, a tensor of 56×1 is generated.

Step 3064: The second terminal device activates the third tensor to obtain the label information vector.

In some embodiments, after the full-connection network layer included in the enhancement network performs full-connection processing to obtain the third tensor having the same dimension as the second tensor, the second terminal device can invoke the activation layer included in the enhancement network, that is, an activation function (for example, a ReLU function, a Sigmoid function, or a Tanh function) to activate the third tensor. Accordingly, the label information vector having the same dimension as the predicted value of the feature vector is generated. For example, as shown in FIG. 13, the dimension of the third tensor is 56×1, and after the ReLU function is invoked to activate the third tensor, a label information vector having a dimension of 56×1 is obtained.

In some other embodiments, when the predicted value of the feature vector includes the predicted value of the feature vector of the low-frequency sub-band signal and the predicted value of the feature vector of the high-frequency sub-band signal, the second terminal device can further implement the foregoing step 306 in the following manner. Label extraction processing is performed on the predicted value of the feature vector of the low-frequency sub-band signal to obtain a first label information vector, a dimension of the first label information vector being the same as a dimension of the predicted value of the feature vector of the low-frequency sub-band signal, and the first label information vector being used for signal enhancement of the low-frequency sub-band signal. Label extraction processing is performed on the predicted value of the feature vector of the high-frequency sub-band signal to obtain a second label information vector, a dimension of the second label information vector being the same as a dimension of the predicted value of the feature vector of the high-frequency sub-band signal, and the second label information vector being used for signal enhancement of the high-frequency sub-band signal.

For example, the second terminal device can implement the foregoing performing label extraction processing on the predicted value of the feature vector of the low-frequency sub-band signal to obtain a first label information vector in the following manner. A first enhancement network is invoked to perform the following processing: performing convolution processing on the predicted value of the feature vector of the low-frequency sub-band signal to obtain a fourth tensor having a same dimension as the predicted value of the feature vector of the low-frequency sub-band signal; performing feature extraction processing on the fourth tensor to obtain a fifth tensor having a same dimension as the fourth tensor; performing full-connection processing on the fifth tensor to obtain a sixth tensor having a same dimension as the fifth tensor; and activating the sixth tensor to obtain the first label information vector.

For example, the second terminal device can implement the foregoing performing label extraction processing on the predicted value of the feature vector of the high-frequency sub-band signal to obtain a second label information vector in the following manner. A second enhancement network is invoked to perform the following processing: performing convolution processing on the predicted value of the feature vector of the high-frequency sub-band signal to obtain a seventh tensor having a same dimension as the predicted value of the feature vector of the high-frequency sub-band signal; performing feature extraction processing on the seventh tensor to obtain an eighth tensor having a same dimension as the seventh tensor; performing full-connection processing on the eighth tensor to obtain a ninth tensor having a same dimension as the eighth tensor; and activating the ninth tensor to obtain the second label information vector.

The label extraction process for the predicted value of the feature vector of the low-frequency sub-band signal and the label extraction process for the predicted value of the feature vector of the high-frequency sub-band signal are similar to the label extraction process for the predicted value of the feature vector of the audio signal, and are implemented with reference to the description in FIG. 6A. Details are not described again in embodiments of this application. The structures of the first enhancement network and the second enhancement network are similar to the structure of the foregoing enhancement network. Details are not described again in embodiments of this application.

In some embodiments, when the predicted value of the feature vector includes the predicted values of the feature vectors corresponding to the N sub-band signals, respectively, the second terminal device can further implement the foregoing step 306 in the following manner. Label extraction processing is performed on the predicted values of the feature vectors corresponding to the N sub-band signals respectively to obtain N label information vectors, a dimension of each label information vector being the same as a dimension of the predicted value of the feature vector of the corresponding sub-band signal.

For example, the second terminal device can implement the foregoing performing label extraction processing on the predicted values of the feature vectors corresponding to the N sub-band signals respectively to obtain N label information vectors in the following manner. An $i^{th}$ enhancement network is invoked, based on a predicted value of a feature vector of an $i^{th}$ sub-band signal, for label extraction processing to obtain an $i^{th}$ label information vector, a value range of i satisfying that i is greater than or equal to 1 and is smaller than or equal to N, a dimension of the $i^{th}$ label information vector being the same as a dimension of the predicted value of the feature vector of the $i^{th}$ sub-band signal, and the $i^{th}$ label information vector being used for signal enhancement of the $i^{th}$ sub-band signal.

For example, the second terminal device can implement the foregoing invoking, based on a predicted value of a feature vector of an $i^{th}$ sub-band signal, an $i^{th}$ enhancement network for label extraction processing to obtain an $i^{th}$ label information vector in the following manner. The $i^{th}$ enhancement network is invoked to perform the following processing: performing convolution processing on the predicted value of the feature vector of the $i^{th}$ sub-band signal to obtain a tenth tensor having a same dimension as the predicted value of the feature vector of the $i^{th}$ sub-band signal; performing feature extraction processing on the tenth tensor to obtain an eleventh tensor having a same dimension as the tenth tensor; performing full-connection processing on the eleventh tensor to obtain a twelfth tensor having a same dimension as the eleventh tensor; and activating the twelfth tensor to obtain the $i^{th}$ label information vector.

The structure of the $i^{th}$ enhancement network is similar to the structure of the foregoing enhancement network. Details are not described again in embodiments of this application.

Step 307: The second terminal device performs signal reconstruction based on the predicted value of the feature vector and the label information vector to obtain a predicted value of the audio signal.

In some embodiments, the second terminal device can implement step 307 in the following manner. The predicted value of the feature vector and the label information vector are spliced to obtain a spliced vector. The spliced vector is compressed to obtain the predicted value of the audio signal. The compression processing can be implemented by one or more cascades of convolution processing, upsampling processing, and pooling processing, for example, can be implemented by the following step 3072 to step 3075. The predicted value of the audio signal includes predicted values corresponding to parameters such as frequency, wavelength, and amplitude of the audio signal.

In some other embodiments, based on the predicted value of the feature vector and the label information vector, the second terminal device can invoke a synthesis network to perform signal reconstruction to obtain the predicted value of the audio signal. The synthesis network includes a first convolutional layer, an upsampling layer, a pooling layer, and a second convolutional layer. The following describes a process of signal reconstruction with reference to the foregoing structure of the synthesis network.

Figure 6B:
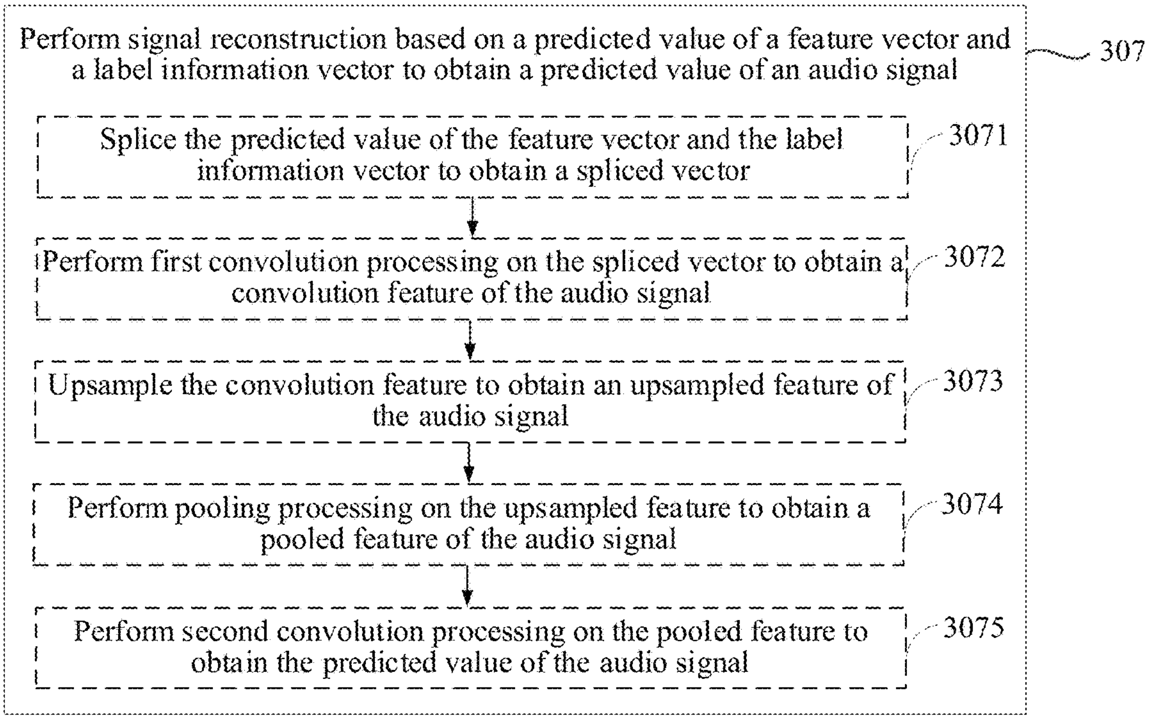

For example, FIG. 6B is a schematic flowchart of an audio decoding method according to an embodiment of this application. As shown in FIG. 6B, step 307 shown in FIG. 4C can be implemented by step 3071 to step 3075 shown in FIG. 6B. A description is carried out with reference to the steps shown in FIG. 6B.

Step 3071: The second terminal device splices the predicted value of the feature vector and the label information vector to obtain a spliced vector.

In some embodiments, the second terminal device can splice the predicted value of the feature vector obtained based on step 305 and the label information vector obtained based on step 306 to obtain the spliced vector, and use the spliced vector as input of the synthesis network for signal reconstruction.

Step 3072: The second terminal device performs first convolution processing on the spliced vector to obtain a convolution feature of the audio signal.

Figure 14:
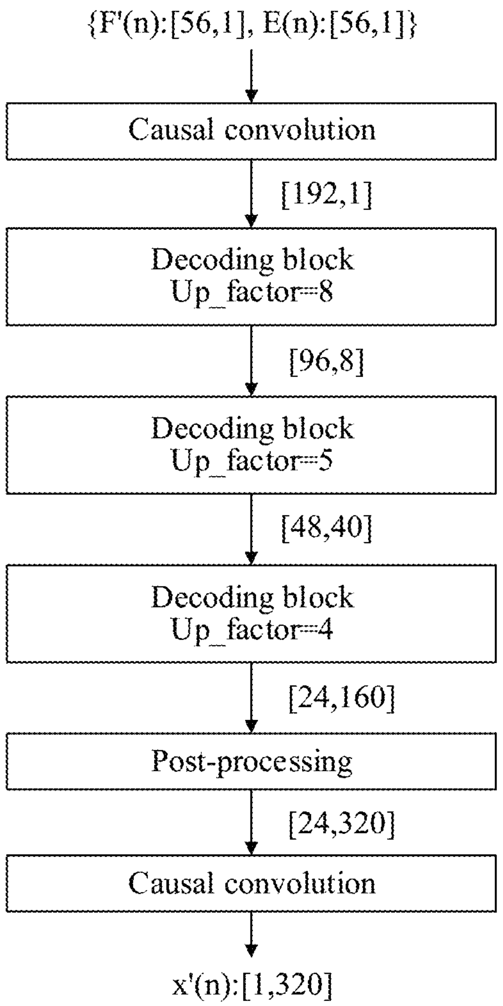
FIG. 14 is a schematic diagram of the structure of a synthesis network according to an embodiment of this application.

In some embodiments, after splicing the predicted value of the feature vector and the label information vector to obtain the spliced vector, the second terminal device can invoke the first convolutional layer included in the synthesis network (for example, a one-dimensional causal convolution) to perform convolution processing on the spliced vector to obtain the convolution feature of the audio signal. For example, as shown in FIG. 14, after causal convolution processing is performed on the spliced vector, a tensor (that is, the convolution feature of the audio signal) having a dimension of 192×1 is obtained.

Step 3073: The second terminal device upsamples the convolution feature to obtain an upsampled feature of the audio signal.

In some embodiments, after obtaining the convolution feature of the audio signal, the second terminal device can invoke the upsampling layer included in the synthesis network to upsample the convolution feature of the audio signal. The upsampling processing can be implemented by a plurality of cascaded decoding layers, and sampling factors of different decoding layers are different. The second terminal device can upsample the convolution feature of the audio signal to obtain the upsampled feature of the audio signal in the following manner. The convolution feature is upsampled by using the first decoding layer among the plurality of cascaded decoding layers. An upsampling result of the first decoding layer is outputted to a subsequent cascaded decoding layer, and the upsampling processing and the upsampling result output are continued by using the subsequent cascaded decoding layer until the output reaches the last decoding layer. An upsampling result output by the last decoding layer is used as the upsampled feature of the audio signal.

The foregoing upsampling processing is a method of increasing the dimension of the convolution feature of the audio signal. For example, the convolution feature of the audio signal can be upsampled by interpolation (such as bilinear interpolation) to obtain the upsampled feature of the audio signal. The dimension of the upsampled feature is larger than the dimension of the convolution feature. In other words, the dimension of the convolution feature can be increased by upsampling processing.

Referring to FIG. 14, a plurality of cascaded decoding layers (also referred to as decoding blocks) are three cascaded decoding layers is used as an example. Three decoding layers having different upsampling factors (Up_factors) can cascade. A decoding layer (Up_factor=8) is used as an example. One or more dilated convolutions can be performed first. Each convolution kernel size is fixed at 1×3 and a stride rate at 1. In addition, a dilation rate of one or more dilated convolutions can be set according to requirements, for example, can be set to 3. Certainly, different dilation rates to be set for different dilated convolutions are not limited in embodiments of this application. Then, the Up_factors of the three decoding layers are set to 8, 5, and 4, respectively. This is equivalent to setting pooling factors of different sizes to play the role of upsampling. Finally, quantities of channels of the three decoding layers are set to 96, 48, and 24, respectively. Accordingly, after upsampling processing on the three decoding layers, the convolution feature (such as a tensor of 192×1) of the audio signal is converted into tensors of 96×8, 48×40, and 24×160 in sequence. The tensor of 24×160 can be used as the upsampled feature of the audio signal.

Step 3074: The second terminal device performs pooling processing on the upsampled feature to obtain a pooled feature of the audio signal.

In some embodiments, after upsampling the convolution feature of the audio signal to obtain the upsampled feature of the audio signal, the second terminal device can invoke the pooling layer in the synthesis network to perform pooling processing on the upsampled feature. For example, a pooling operation with a factor of 2 is performed on the upsampled feature to obtain the pooled feature of the audio signal. For example, refer to FIG. 14. The upsampled feature of the audio signal is a tensor of 24×160, and after pooling processing (that is, post-processing shown in FIG. 14), a tensor (that is, the pooled feature of the audio signal) of 24×320 is generated.

Step 3075: The second terminal device performs a second convolution processing on the pooled feature to obtain the predicted value of the audio signal.

In some embodiments, after performing pooling processing on the upsampled feature of the audio signal to obtain the pooled feature of the audio signal, the second terminal device can further invoke the second convolutional layer included in the synthesis network for the pooled feature of the audio signal. For example, a causal convolution shown in FIG. 14 is invoked to perform dilated convolution processing on the pooled feature to generate the predicted value of the audio signal. In some other embodiments, when the predicted value of the feature vector includes the predicted value of the feature vector of the low-frequency sub-band signal and the predicted value of the feature vector of the high-frequency sub-band signal, the second terminal device can further implement the foregoing step 307 in the following manner. The predicted value of the feature vector of the low-frequency sub-band signal and the first label information vector (that is, a label information vector obtained by performing label extraction processing on the predicted value of the feature vector of the low-frequency sub-band signal) are spliced to obtain a first spliced vector. A first synthesis network is invoked, based on the first spliced vector, for signal reconstruction to obtain a predicted value of the low-frequency sub-band signal. The predicted value of the feature vector of the high-frequency sub-band signal and the second label information vector (that is, a label information vector obtained by performing label extraction processing on the predicted value of the feature vector of the high-frequency sub-band signal) are spliced to obtain a second spliced vector. A second synthesis network is invoked, based on the second spliced vector, for signal reconstruction to obtain a predicted value of the high-frequency sub-band signal. The predicted value of the low-frequency sub-band signal and the predicted value of the high-frequency sub-band signal are synthesized to obtain the predicted value of the audio signal.

In some embodiments, the second terminal device can implement the foregoing invoking, based on the first spliced vector, a first synthesis network for signal reconstruction to obtain a predicted value of the low-frequency sub-band signal in the following manner. The first synthesis network is invoked to perform the following processing: performing first convolution processing on the first spliced vector to obtain a convolution feature of the low-frequency sub-band signal; upsampling the convolution feature of the low-frequency sub-band signal to obtain an upsampled feature of the low-frequency sub-band signal; performing pooling processing on the upsampled feature of the low-frequency sub-band signal to obtain a pooled feature of the low-frequency sub-band signal; and performing second convolution processing on the pooled feature of the low-frequency sub-band signal to obtain the predicted value of the low-frequency sub-band signal, the upsampling process being implemented by using a plurality of cascaded decoding layers, and sampling factors of different decoding layers being different.

In some embodiments, the second terminal device can implement the foregoing invoking, based on the second spliced vector, a second synthesis network for signal reconstruction to obtain a predicted value of the high-frequency sub-band signal in the following manner. The second synthesis network is invoked to perform the following processing: performing first convolution processing on the second spliced vector to obtain a convolution feature of the high-frequency sub-band signal; upsampling the convolution feature of the high-frequency sub-band signal to obtain an upsampled feature of the high-frequency sub-band signal; performing pooling processing on the upsampled feature of the high-frequency sub-band signal to obtain a pooled feature of the high-frequency sub-band signal; and performing second convolution processing on the pooled feature of the high-frequency sub-band signal to obtain the predicted value of the high-frequency sub-band signal, the upsampling process being implemented by using a plurality of cascaded decoding layers, and sampling factors of different decoding layers being different.

The reconstruction process for the low-frequency sub-band signal (that is, a generation process of the predicted value of the low-frequency sub-band signal) and the reconstruction process for the high-frequency sub-band signal (that is, a generation process of the predicted value of the high-frequency sub-band signal) are similar to the reconstruction process of the audio signal (that is, a generation process of the predicted value of the audio signal), and are implemented with reference to the description in FIG. 6B. Details are not described again in embodiments of this application. Structures of the first synthesis network and the second synthesis network are similar to the structure of the foregoing synthesis network. Details are not described again in embodiments of this application.

In some other embodiments, when the predicted value of the feature vector includes the predicted values of the feature vectors corresponding to the N sub-band signals, respectively, the second terminal device can further implement the foregoing step 307 in the following manner. The predicted values of the feature vectors corresponding to the N sub-band signals respectively and the N label information vectors are spliced one-to-one to obtain N spliced vectors. A $j^{th}$ synthesis network is invoked, based on a $j^{th}$ spliced vector, for signal reconstruction to obtain a predicted value of a $j^{th}$ sub-band signal, a value range of j satisfying that j is greater than or equal to 1 and is smaller than or equal to N. Predicted values corresponding to the N sub-band signals respectively are synthesized to obtain the predicted value of the audio signal.

In some embodiments, the second terminal device can implement the foregoing invoking, based on a $j^{th}$ spliced vector, a $j^{th}$ synthesis network for signal reconstruction to obtain a predicted value of a $j^{th}$ sub-band signal in the following manner. The $j^{th}$ synthesis network is invoked to perform the following processing: performing first convolution processing on the $j^{th}$ spliced vector to obtain a convolution feature of the $j^{th}$ sub-band signal; upsampling the convolution feature of the $j^{th}$ sub-band signal to obtain an upsampled feature of the $j^{th}$ sub-band signal; performing pooling processing on the upsampled feature of the $j^{th}$ sub-band signal to obtain a pooled feature of the $j^{th}$ sub-band signal; and performing second convolution processing on the pooled feature of the $j^{th}$ sub-band signal to obtain the predicted value of the $j^{th}$ sub-band signal, the upsampling process being implemented by using a plurality of cascaded decoding layers, and sampling factors of different decoding layers being different.

The structure of the $j^{th}$ synthesis network is similar to the structure of the foregoing synthesis network. Details are not described again in embodiments of this application.

Step 308: The second terminal device uses the predicted value of the audio signal obtained by the signal reconstruction as a decoding result of the bitstream.

In some embodiments, after obtaining the predicted value of the audio signal by the signal reconstruction, the second terminal device can use the predicted value of the audio signal obtained by the signal reconstruction as the decoding result of the bitstream, and send the decoding result to a built-in speaker of the second terminal device for playing.

In the audio decoding method provided in embodiments of this application, label extraction processing is performed on a predicted value of a feature vector obtained by decoding to obtain a label information vector, and signal reconstruction is performed with reference to the predicted value of the feature vector and the label information vector. Because the label information vector reflects core components of an audio signal (that is, not including acoustic interference such as noise), in comparison with signal reconstruction based on only the predicted value of the feature vector, in embodiments of this application, the predicted value of the feature vector and the label information vector are combined for signal reconstruction, which is equivalent to increasing a proportion of the core components (such as human voice) in the audio signal, and reduces a proportion of noise and other acoustic interference (such as background sound) in the audio signal. Therefore, noise components included in the audio signal collected at an encoder side are effectively suppressed, thereby improving quality of a reconstructed audio signal.

The following uses a VoIP conference system as an example to describe an application of an embodiment of this application in an application scenario.

Figure 7:
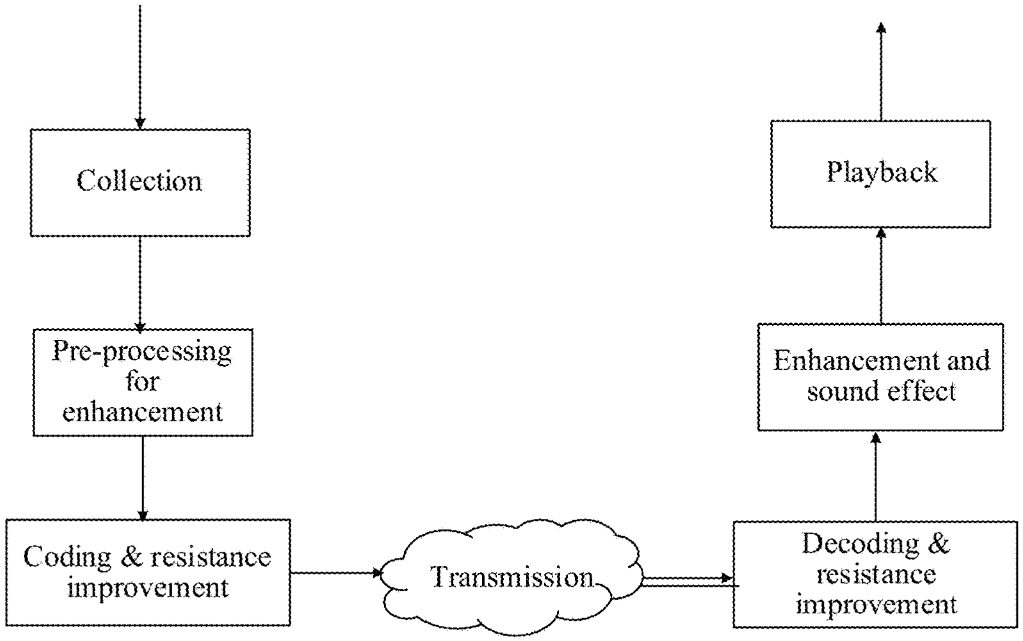
FIG. 7 is a schematic diagram of an end-to-end speech communication link according to an embodiment of this application.

For example, FIG. 7 is a schematic diagram of an end-to-end speech communication link according to an embodiment of this application. As shown in FIG. 7, the audio coding method provided in embodiments of this application can be applied at an encoder side (that is, a transmitting end of a bitstream), and the audio decoding method provided in embodiments of this application can be applied at a decoder side (that is, a receiving end of a bitstream). The end-to-end speech communication link is a core part of a communication system such as a conference, and provides a basic function of compression. Generally, an encoder is deployed on an uplink client, and a decoder is deployed on a downlink client.

In addition, considering forward compatibility, a transcoder needs to be deployed in a server to resolve an interconnection problem between a new encoder and an encoder of the related art. For example, if a new NN encoder is deployed at the transmitting end, and a decoder (such as a G.722 decoder) of a conventional public switched telephone network (PSTN) is deployed at the receiving end, the receiving end cannot correctly decode a bitstream sent directly by the transmitting end. Therefore, after receiving the bitstream sent by the transmitting end, the server first needs to execute the NN decoder to generate a speech signal, and then invokes a G.722 encoder to generate a specific bitstream, to enable the receiving end to decode correctly. Similar transcoding scenarios are not described in detail.

The following describes the audio coding method and the audio decoding method provided in embodiments of this application in detail.

Figure 8:
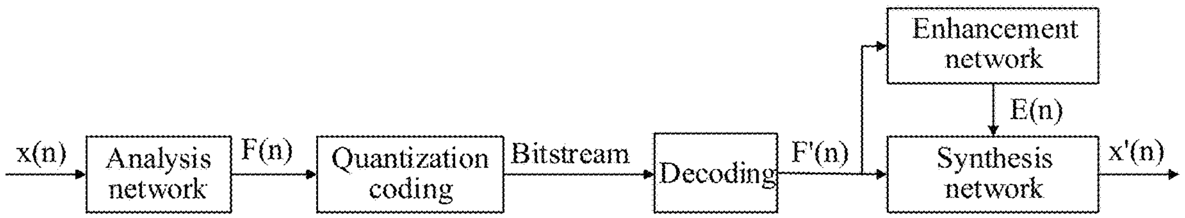
FIG. 8 is a schematic flowchart of an audio coding method and an audio decoding method according to an embodiment of this application.

In some embodiments, FIG. 8 is a schematic flowchart of an audio coding method and an audio decoding method according to an embodiment of this application. As shown in FIG. 8, main steps at an encoder side include: For an input signal, such as an $n^{th}$ frame speech signal, denoted as x(n), an analysis network is invoked for feature extraction processing to obtain a low-dimensional feature vector, denoted as F(n). In particular, a dimension of the feature vector F(n) is smaller than a dimension of the input signal x(n), thereby reducing data volume. In one embodiment, a dilated convolution network (Dilated CNN) can be invoked to perform feature extraction processing on the $n^{th}$ frame speech signal x(n) to generate a feature vector F(n) having a lower dimension. Other NN structures are not limited in embodiments of this application, including but not limited to an autoencoder (AE), a full-connection (FC) network, a long short-term memory (LSTM) network, a convolutional neural network (CNN)+ the LSTM network, and the like. After the feature vector F(n) is obtained, vector quantization or scalar quantization can be performed on the feature vector F(n), and entropy coding is performed on an index value obtained by quantization to obtain a bitstream, and finally the bitstream is transmitted to a decoder side.

Still refer to FIG. 8. Main steps at the decoder side include: the received bitstream is decoded to obtain an estimated value of the feature vector, which is denoted as F'(n). Then an enhancement network is invoked based on the estimated value F'(n) of the feature vector to generate a label information vector for enhancement, which is denoted as E(n). Finally, the estimated value F'(n) of the feature vector and the label information vector E(n) are combined to invoke a synthesis network (which is corresponding to an inverse process of the encoder side) for signal reconstruction, suppress noise components included in a speech signal collected at the encoder side, and generate an estimated signal value corresponding to the input signal x(n), which is denoted as X'(n).

To better understand the audio coding method and the audio decoding method provided in embodiments of this application, before detailed descriptions of the audio coding method and the audio decoding method provided in embodiments of this application, the dilated convolution network and a QMF filter bank are first introduced.

Figure 9A:
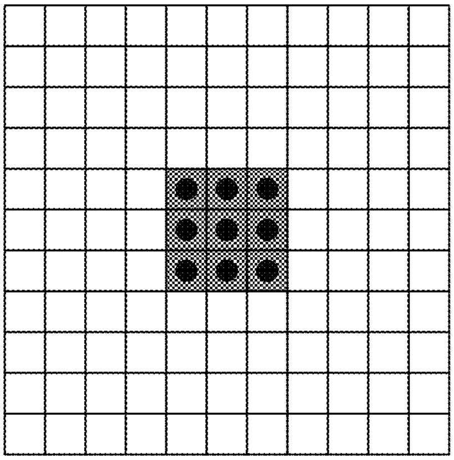
FIG. 9A is a schematic diagram of an ordinary convolution according to an embodiment of this application.
Figure 9B:
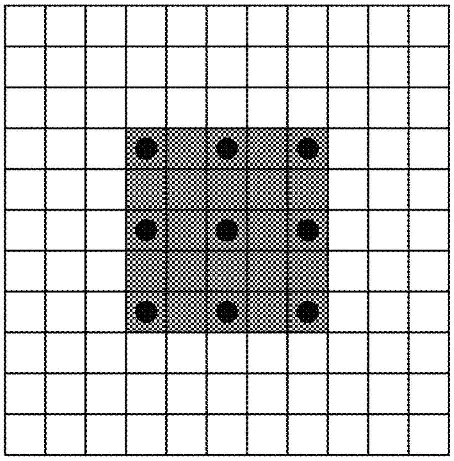
FIG. 9B is a schematic diagram of a dilated convolution according to an embodiment of this application.

For example, referring to FIG. 9A and FIG. 9B, FIG. 9A is a schematic diagram of an ordinary convolution according to an embodiment of this application. FIG. 9B is a schematic diagram of a dilated convolution according to an embodiment of this application. In comparison with the ordinary convolution, the dilated convolution is proposed to increase a receptive field while keeping a size of a feature map unchanged, thereby avoiding errors caused by upsampling and downsampling. Convolution kernel sizes shown in FIG. 9A and FIG. 9B are both 3×3. However, a receptive field of the ordinary convolution shown in FIG. 9A is only 3, while a receptive field of the dilated convolution shown in FIG. 9B reaches 5. In other words, for the convolution kernel size of 3×3, the receptive field of the ordinary convolution shown in FIG. 9A is 3, and a dilation rate is 1. The receptive field of the dilated convolution shown in FIG. 9B is 5 and a dilation rate is 2.

The convolution kernel can also move on a plane similar to FIG. 9A or FIG. 9B. The concept of a stride rate is involved. For example, assuming that the convolution kernel strides by 1 frame each time, a corresponding stride rate is 1.

In addition, there is also a concept of a quantity of convolutional channels, which is a quantity of parameters corresponding to a quantity of convolution kernels used for performing convolution analysis. Theoretically, a larger quantity of channels indicates more comprehensive signal analysis and higher accuracy. However, the larger quantity of channels indicates higher complexity. For example, for a tensor of 1×320, a 24-channel convolution operation can be used, and an output is a tensor of 24×320.

A dilated convolution kernel size (for example, for a speech signal, the convolution kernel size is generally 1×3), a dilation rate, a stride rate, a quantity of channels, and the like can be defined according to specific application needs. This is not specifically limited to embodiments of this application.

The following continues to describe the QMF filter bank.

Figure 10:
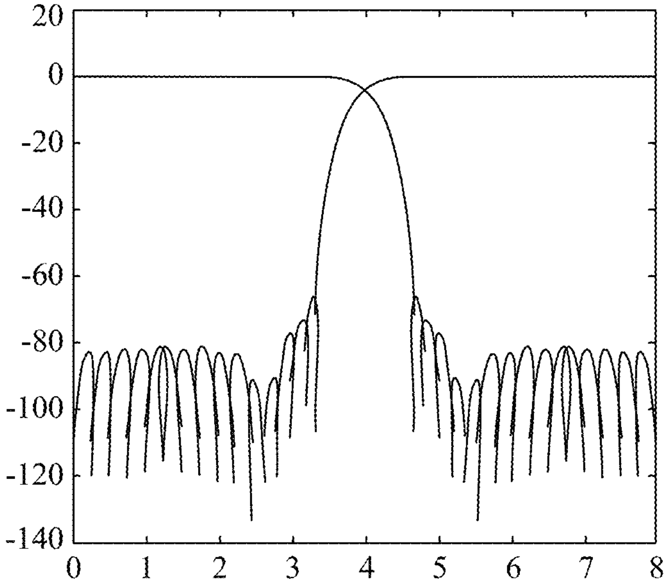
FIG. 10 is a schematic diagram of frequency spectrum response of a low-pass part and a high-pass part of a QMF analysis filter bank according to an embodiment of this application.

The QMF filter bank is a filter pair including analysis-synthesis. For the QMF analysis filter, an input signal having a sampling rate of Fs can be decomposed into two signals having a sampling rate of Fs/2, which represent a QMF low-pass signal and a QMF high-pass signal, respectively. FIG. 10 shows frequency spectrum response of a low-pass part H_Low(z) and a high-pass part H_High(z) of a QMF analysis filter bank. According to related theoretical knowledge of the QMF analysis filter bank, a correlation between coefficients of the foregoing low-pass filtering and high-pass filtering can be easily described.

$$h_{High}(k) = -1^k h_{Low}(k) \quad (1)$$

$h_{Low}(k)$ represents the coefficient of the low-pass filtering. $h_{High}(k)$ represents the coefficient of the high-pass filtering.

Similarly, according to related theories of QMF, the QMF synthetic filter bank can also be described based on the H_Low(z) and H_High(z) of the QMF analysis filter bank. A detailed mathematical background is not described herein again.

$$G_{Low}(z) = H_{Low}(z) \quad (2)$$

$$G_{High}(z) = (-1) * H_{High}(z) \quad (3)$$

$G_{Low}(z)$ represents a recovered low-pass signal. $G_{High}(z)$ represents a recovered high-pass signal.

After being recovered from a decoder side, the low-pass signal and the high-pass signal are synthesized by the QMF synthesis filter bank to recover a reconstructed signal having the sampling rate of Fs corresponding to the input signal.

Figure 11A:
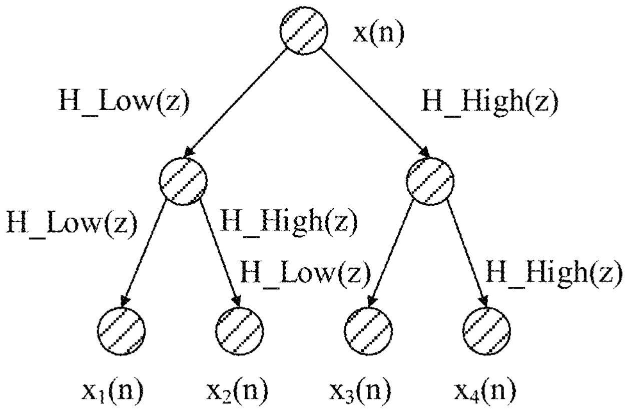
FIG. 11*a* is a schematic diagram of a four-channel sub-band signal obtained based on a QMF filter bank according to an embodiment of this application.
Figure 11B:
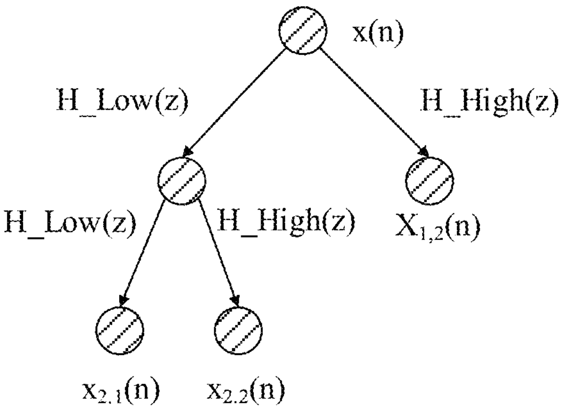
FIG. 11B is a schematic diagram of a three-channel sub-band signal obtained based on a QMF filter bank according to an embodiment of this application.

In addition, the foregoing 2-channel QMF solution can also be expanded to an N-channel QMF solution. In particular, a method of binary tree can be used to iteratively perform 2-channel QMF analysis on the current sub-band signal to obtain a sub-band signal having a lower resolution. FIG. 11A shows that two layers of 2-channel QMF analysis filters are iterated to obtain a 4-channel sub-band signal. FIG. 11B shows another implementation method. Considering that a high-frequency part of a signal has little impact on quality, there is no need for such high-precision analysis. Therefore, only high-pass filtering is needed to be performed on an original signal once. Similarly, more channels can be implemented, such as 8-channel, 16-channel, and 32-channel. This is not described in detail herein.

The following describes the audio coding method and the audio decoding method provided in embodiments of this application in detail.

In some embodiments, a speech signal having a sampling rate: Fs=16000 Hz is used as an example. The methods provided in embodiments of this application are also applicable to another sampling rate scenario, including but not limited to 8000 Hz, 32000 Hz, and 48000 Hz. In addition, it is assumed that the frame length is set to 20 ms. Therefore, that Fs=16000 Hz is equivalent to each frame including 320 sample points.

The following describes flows of an encoder side and a decoder side in detail respectively with reference to the schematic flowchart of the audio coding method and the audio decoding method shown in FIG. 8

(1) The flow on the encoder side is as follows.

First, an input signal is generated.

As mentioned before, for the speech signal having the sampling rate: Fs=16000 Hz, assuming that a frame length is 20 ms, a speech signal of an $n^{th}$ frame includes 320 sample points, and is denoted as an input signal x(n).

Then, an analysis network is invoked for data compression.

An objective of the analysis network is to generate, based on the input signal x(n), a feature vector F(n) having a lower dimension by invoking the analysis network (such as a neural network). In this embodiment, a dimension of the input signal x(n) is 320, and a dimension of the feature vector F(n) is 56. From the perspective of data volume, feature extraction by the analysis network plays the role of "dimension reduction" and implements the function of data compression.

Figure 12:
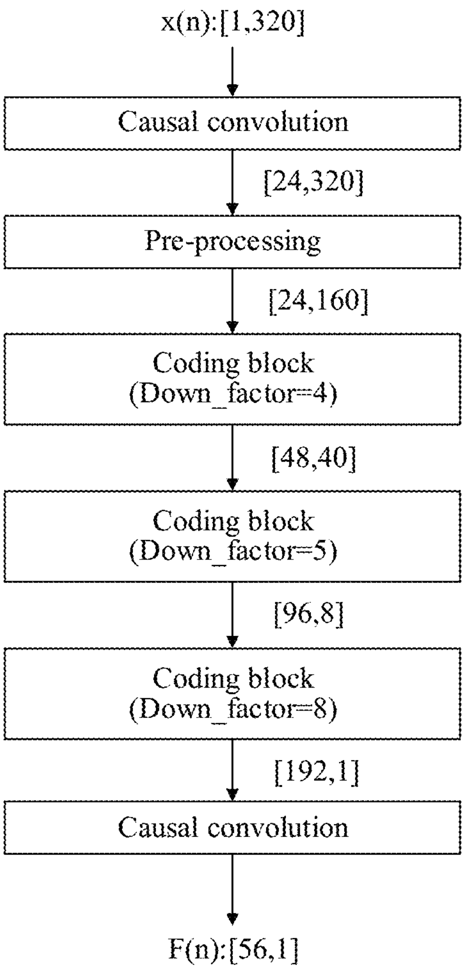
FIG. 12 is a schematic diagram of a structure of an analysis network according to an embodiment of this application.

For example, FIG. 12 is a schematic diagram of the structure of an analysis network according to an embodiment of this application. As shown in FIG. 12, a 24-channel causal convolution is first invoked to dilate an input signal x(n) into a tensor of 24×320. The input signal x(n) is a tensor of 1×320. Then the tensor of 24×320 obtained by dilation is preprocessed. For example, a pooling operation with a factor of 2 can be performed on the tensor of 24×320 obtained by dilation, and an activation function can be a linear rectification function (ReLU) to generate a tensor of 24×160. Next, three coding blocks having different downsampling factors (Down_factor) can cascade. A coding block (Down_factor=4) is used as an example. One or more dilated convolutions can be performed first. Each convolution kernel size is fixed at 1×3 and a stride rate at 1. In addition, a dilation rate of one or more dilated convolutions can be set according to requirements, for example, can be set to 3. Certainly, different dilation rates to be set for different dilated convolutions are not limited in embodiments of this application. Then, the Down_factors of the three coding blocks are set to 4, 5, and 8, respectively. This is equivalent to setting pooling factors of different sizes to play the role of upsampling. Finally, quantities of channels of the three coding blocks are set to 48, 96, and 192, respectively. Accordingly, after downsampling processing on the three coding blocks, the tensor of 24×160 is converted into tensors of 48×40, 96×8, and 192×1 in sequence. Finally, for the tensor of 192×1, a 56-dimensional feature vector F(n) can be output after a causal convolution similar to the preprocessing.

Next, quantization coding is performed.

For a feature vector F(n) extracted at the encoder side, scalar quantization (that is, each component is quantized individually) and entropy coding can be used for quantization coding. Certainly, vector quantization (that is, a plurality of adjacent components is combined into one vector for joint quantization) and entropy coding can also be used for quantization coding. This is not specifically limited to embodiments of this application.

After quantization coding on the feature vector F(n), a bitstream can be generated. According to experiments, high-quality compression on a 16 kHz broadband signal can be achieved based on a bit rate of 6 kbps to 8 kbps.

(2) The flow on the decoder side is as follows.

First, decoding is performed.

Decoding is a reverse process of coding. The received bitstream is decoded, then a quantization table is queried based on the index value obtained by decoding to obtain an estimated value of the feature vector, which is denoted as F'(n).

Then, an enhancement network is invoked to extract a label information vector.

The estimated value F'(n) of the feature vector includes a compressed version of an original speech signal collected at the encoder side, reflecting core components of the speech signal, and also includes acoustic interference such as noise mixed during collection. Therefore, the enhancement network is used for collecting related label embedding information from the estimated value F'(n) of the feature vector, to generate a clean speech signal during decoding.

For example, FIG. 13 is a schematic diagram of the structure of an enhancement network according to an embodiment of this application. As shown in FIG. 13, the estimated value F'(n) of the feature vector is used as an input quantity, a one-dimensional causal convolution is invoked to generate a tensor of 56×1. Next, for the tensor of 56×1, by using a layer of LSTM network, a tensor of 56×1 is generated. Then, a full-connection (FC) network is invoked to generate a tensor of 56×1. Finally, an activation function (for example, which can be ReLU, certainly, also can be another activation function, such as a Sigmoid function and a Tanh function) is invoked for activation processing. Accordingly, a label information vector having the same dimension as the estimated value F'(n) of the feature vector is generated, and is denoted as E(n). Next, a synthesis network is invoked for signal reconstruction.

An objective of the synthesis network is to splice the estimated value F'(n) of the feature vector obtained at the decoder side and the locally generated label information vector E(n) to a 112-dimensional vector. Then the synthesis network is invoked for signal reconstruction to generate an estimated value of the speech signal, which is denoted as X'(n). For the synthesis network, generating an input vector by splicing is only one of the methods. Another method is not limited to embodiments of this application. For example, F'(n)+E(n) can be used as input, and a dimension is 56. For this method, the network can be redesigned with reference to FIG. 14. Details are not described again in embodiments of this application.

For example, FIG. 14 is a schematic diagram of the structure of a synthesis network according to an embodiment of this application. As shown in FIG. 14, the structure of the synthesis network is highly similar to a structure of an analysis network, such as a causal convolution. However, the dimension of an input quantity increases to 112 dimensions. A process of post-processing is similar to preprocessing in the analysis network. In addition, a structure of a decoding block (also referred to as a decoding layer) is symmetrical to a structure of a coding block (also referred to as an encoding layer) in the analysis network. For example, the coding block in the analysis network first performs dilated convolution and then pooling to complete downsampling, while the decoding block in the synthesis network first performs pooling to complete upsampling, and then performs dilated convolution. In other words, decoding is a reverse process of coding. Reference can be made to the description in FIG. 12. Details are not described again in embodiments of this application.

In embodiments of this application, the related networks (such as the analysis network and the synthesis network) at the encoder side and the decoder side can be jointly trained by collecting data to obtain optimal parameters. Currently, there are a plurality of disclosed source platforms for neural networks and deep learning. Based on the foregoing source platforms, a user only needs to prepare data and set up a corresponding network structure. After a server completes training, a trained network can be put into use. In the foregoing embodiment of this application, it is assumed that the parameters of the analysis network and the synthesis network are trained, and only an implementation of a specific network input, network structure, and network output is disclosed. Engineers in the related fields can further modify the foregoing configuration according to specific conditions.

In the foregoing embodiment, for an input signal, on a coding/decoding path, the analysis network, the enhancement network, and the synthesis network are respectively invoked to complete low bit rate compression and signal reconstruction. However, the complexity of these networks is high. To reduce the complexity, embodiments of this application can introduce a QMF analysis filter to decompose the input signal into sub-band signals having a lower bit rate. Then, for each sub-band signal, the input dimension and an output dimension of the neural network are to be at least halved. Generally, computational complexity of the neural networks is $O(N^3)$. Therefore, this "divide and conquer" idea can effectively reduce the complexity.

Figure 15:
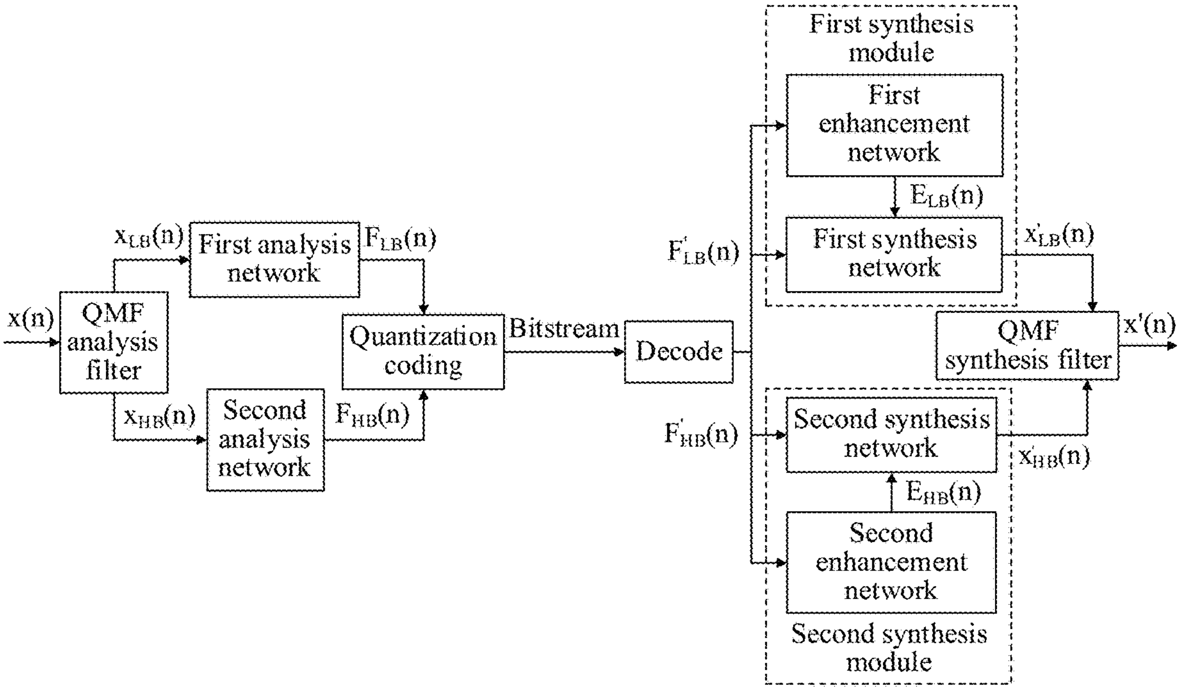
FIG. 15 is a schematic flowchart of an audio coding method and an audio decoding method according to an embodiment of this application.

For example, FIG. 15 is a schematic flowchart of an audio coding method and an audio decoding method according to an embodiment of this application. As shown in FIG. 15, a QMF analysis filter is used for decomposing an input signal x(n) of an $n^{th}$ frame into two sub-band signals. For example, after the input signal x(n) is decomposed by the QMF analysis filter, a low-frequency sub-band signal, denoted as $x_{LB}(n)$, and a high-frequency sub-band signal, denoted as $x_{HB}(n)$, can be obtained. Then, for the low-frequency sub-band signal $x_{LB}(n)$, a first analysis network can be invoked to obtain a low-dimensional feature vector of the low-frequency sub-band signal, which is denoted as $F_{LB}(n)$. In particular, a dimension of the feature vector $F_{LB}(n)$ of the low-frequency sub-band signal is smaller than a dimension of the low-frequency sub-band signal $x_{LB}(n)$, thereby reducing data volume. Because a resolution of the low-frequency sub-band signal $x_{LB}(n)$ is less than half resolution of the input signal x(n), parameters of the first analysis network can be reduced by half correspondingly, including the feature vector $F_{LB}(n)$ of the low-frequency sub-band signal.

After the feature vector $F_{LB}(n)$ of the low-frequency sub-band signal is obtained, vector quantization or scalar quantization can be performed on the feature vector $F_{LB}(n)$ of the low-frequency sub-band signal, and entropy coding is performed on an index value obtained after quantization to obtain a bitstream, and then the bitstream is transmitted to a decoder side.

After receiving the bitstream sent by an encoder side, the decoder side can decode the received bitstream to obtain an estimated value of the feature vector of the low-frequency sub-band signal, which is denoted as $$F'_{LB}(n).$$

Then, based on the estimated value $$F'_{LB}(n)$$

of the feature vector of the low-frequency sub-band signal, a first enhancement network can be invoked to generate a label information vector corresponding to the low-frequency sub-band signal, which is denoted as $E_{LB}(n)$. Finally, $$F'_{LB}(n)$$

and $E_{LB}(n)$ are combined, a first synthesis network corresponding to an inverse process of the encoder side is invoked to complete reconstruction of the estimated value of the low-frequency sub-band signal, denoted as $$x'_{LB}(n),$$

and acoustic interference such as noise included in a speech signal collected at the encoder side is suppressed. For ease of expression, functions of the first enhancement network and the first synthesis network are combined into a first synthesis module below. In other words, at the decoder side, based on $$F'_{LB}(n) \text{ and } E_{LB}(n),$$

the first synthesis module is invoked for signal reconstruction to obtain the estimated value $$x'_{LB}(n)$$

of the low-frequency sub-band signal.

Similarly, by using the QMF analysis filter, the high-frequency sub-band signal is obtained by decomposing the input signal x(n), which is denoted as $x_{HB}(n)$. In a coding/decoding process, a second analysis network and a second synthesis module (which includes a second enhancement network and a second synthesis network) are invoked respectively to obtain an estimated value of the high-frequency sub-band signal at the decoder side, which is denoted as $$x'_{HB}(n).$$

The processing flow for the high-frequency sub-band signal $x_{HB}(n)$ is similar to the processing flow for the low-frequency sub-band signal $x_{LB}(n)$, and can be implemented with reference to the processing flow of the low-frequency sub-band signal $x_{LB}(n)$. Details are not described again in embodiments of this application.

Figure 16:
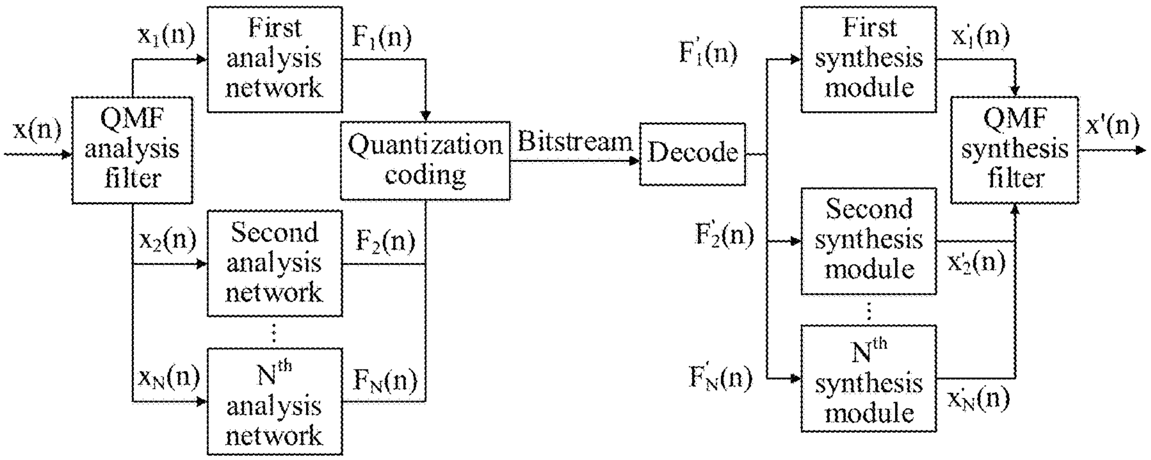
FIG. 16 is a schematic flowchart of an audio coding method and an audio decoding method according to an embodiment of this application.

Refer to the foregoing 2-channel QMF processing example and the multi-channel QMF introduced above. Based on a feature completed by iterating the 2-channel QMF, a multi-channel QMF solution shown in FIG. 16 can be further expanded too. For example, the input signal x(n) can be decomposed into N sub-band signals, and each sub-band signal can be coded and decoded separately. Details are not described again in embodiments of this application due to the similar principle.

The following uses the 2-channel QMF as an example to describe the audio coding method and the audio decoding method provided in embodiments of this application.

(1) The flow on the encoder side is as follows.

First, an input signal is generated.

As mentioned before, for the speech signal having the sampling rate: Fs=16000 Hz, assuming that a frame length is 20 ms, a speech signal of an $n^{th}$ frame includes 320 sample points, and is denoted as an input signal x(n).

Then, the QMF performs signal decomposition.

As mentioned before, for the input signal x(n), the QMF analysis filter (specifically referred to the 2-channel QMF here) can be invoked and downsampling is performed to obtain two parts of sub-band signals, a low-frequency sub-band signal $x_{LB}(n)$ and a high-frequency sub-band signal $x_{HB}(n)$, respectively. Effective bandwidth of the low-frequency sub-band signal $x_{LB}(n)$ is 0 kHz to 4 kHz. Effective bandwidth of the high-frequency sub-band signal $x_{HB}(n)$ is 4 kHz to 8 kHz. The quantity of sample points in each frame is 160.

Next, a first analysis network and a second analysis network are invoked for data compression.

Figure 17:
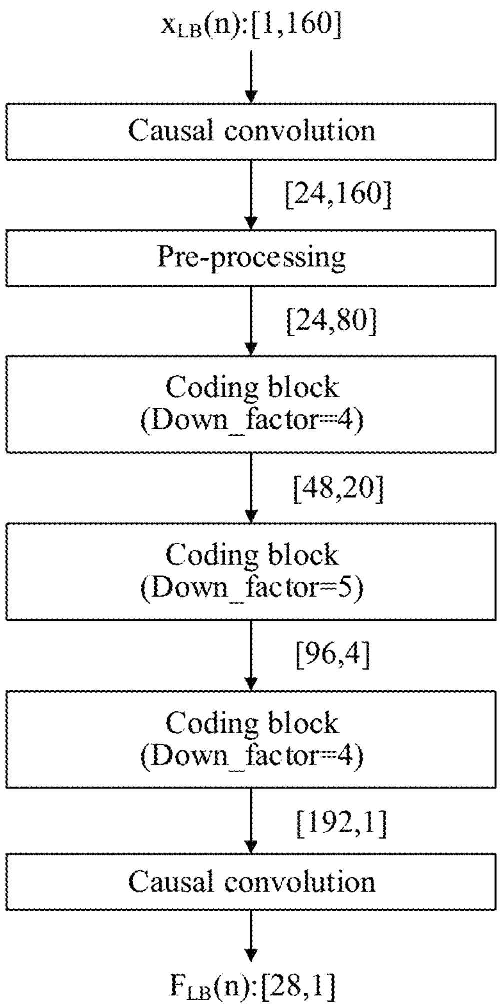
FIG. 17 is a schematic diagram of the structure of a first analysis network according to an embodiment of this application.

For example, after the input signal x(n) are decomposed into the low-frequency sub-band signal $x_{LB}(n)$ and the high-frequency sub-band signal $x_{HB}(n)$, for the low-frequency sub-band signal $x_{LB}(n)$, the first analysis network shown in FIG. 17 can be invoked to perform feature extraction processing to obtain a feature vector $F_{LB}(n)$ of the low-frequency sub-band signal. Similarly, for the high-frequency sub-band signal $x_{HB}(n)$, the second analysis network can be invoked to perform feature extraction processing to obtain a feature vector of the high-frequency sub-band signal, which is denoted as $F_{HB}(n)$.

Because a sampling rate of a sub-band signal is halved relative to an input signal, in this embodiment, a dimension of the feature vector of the output sub-band signal may be lower than a dimension of a feature vector of the input signal in the foregoing embodiment. For example, in this embodiment, dimensions of both the feature vector of the low-frequency sub-band signal and the feature vector of the high-frequency sub-band signal can be set to 28. Accordingly, a dimension of the overall output feature vector is consistent with the dimension of the feature vector of the input signal in the foregoing embodiment. In other words, bit rates of the two feature vectors are consistent.

In addition, considering that low frequency and high frequency have different impact factors on speech quality, defining different quantities of dimensions for feature vectors of different sub-band signals is not limited in embodiments of this application. For example, the dimension of the feature vector of the low-frequency sub-band signal can be set to 32, and the dimension of the feature vector of the high-frequency sub-band signal can be set to 24. This still ensures that a total dimension is consistent with the dimension of the feature vector of the input signal. The foregoing situation can be implemented by correspondingly adjusting internal parameters of the first analysis network and the second analysis network. Details are not described again in embodiments of this application.

Finally, quantization coding is performed.

Similar to the processing process for the feature vector of the input signal, considering that the total dimension of the feature vector remains unchanged, high-quality compression on a 16 kHz wideband signal can be achieved based on a bit rate of 6 kbps to 8 kbps.

(2) The flow on the decoder side is as follows.

First, decoding is performed.

Similar to the foregoing embodiment, a received bitstream is decoded to obtain an estimated value $$F'_{LB}(n)$$

of the feature vector of the low-frequency sub-band signal and an estimated value $$F'_{HB}(n)$$

of the feature vector of the high-frequency sub-band signal.

Then, a first enhancement network and a second enhancement network are invoked to extract a label information vector.

Figure 18:
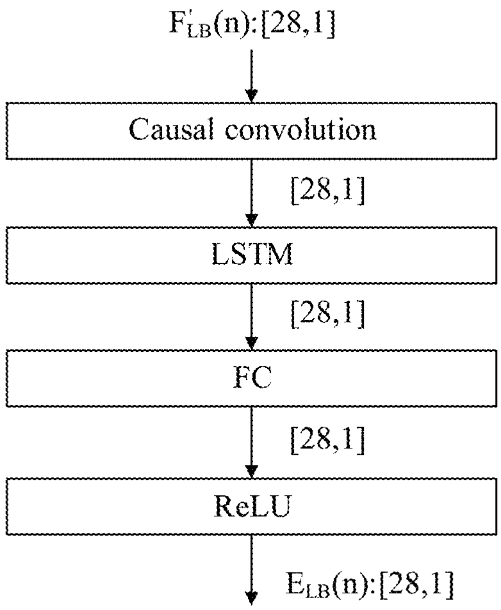
FIG. 18 is a schematic diagram of a structure of a first enhancement network according to an embodiment of this application.

For example, after the received bitstream is decoded to obtain the estimated value $$F'_{LB}(n)$$

of the feature vector of the low-frequency sub-band signal and the estimated value $$F'_{HB}(n)$$

of the feature vector of the high-frequency sub-band signal, for the estimated value $$F'_{LB}(n)$$

of the feature vector of the low-frequency sub-band signal, the first enhancement network shown in FIG. 18 can be invoked to collect label embedding information (that is, a label information vector of a low-frequency part) used for speech enhancement of the low-frequency part. The label embedding information is denoted as $E_{LB}(n)$, and is used for generating a clean low-frequency sub-band speech signal during decoding. The foregoing calculation process can be implemented with reference to FIG. 13. Details are not described again in embodiments of this application. In addition, due to halving of the sampling rate, the dimension of the outputted feature vector of the first analysis network at the encoder side can be referred to, to correspondingly adjust a structure of the first enhancement network shown in FIG. 18, for example, including a quantity of parameters of the first enhancement network.

Similarly, for the estimated value $$F'_{HB}(n)$$

of the feature vector of the high-frequency sub-band signal obtained by decoding, the second enhancement network can be invoked to obtain a label information vector of a high-frequency part, which is denoted as $E_{HB}(n)$, for subsequent processes.

In short, after this step is performed, the label information vectors of the two sub-band signals can be obtained, and are the label information vector $E_{LB}(n)$ of the low-frequency part and the label information vector $E_{HB}(n)$ of the high-frequency part, respectively.

Next, a first synthesis network and a second synthesis network are invoked for signal reconstruction.

Figure 19:
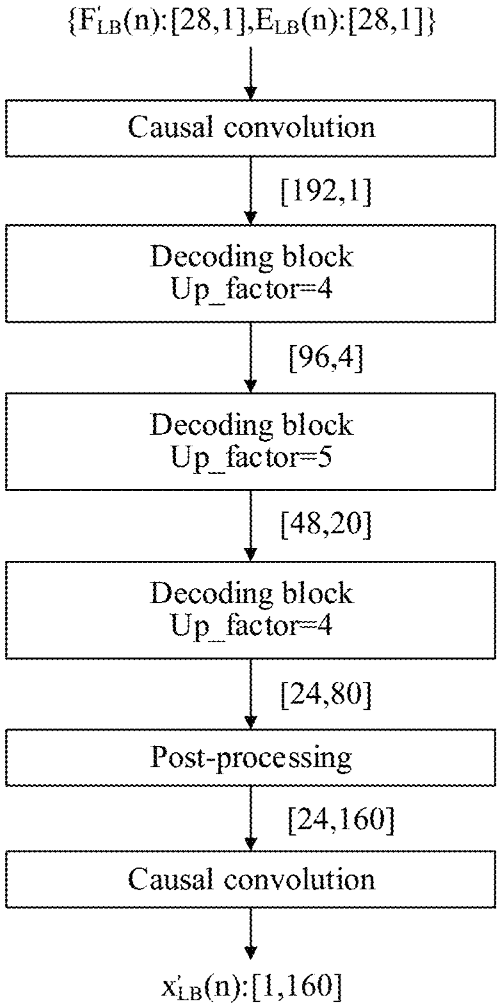
FIG. 19 is a schematic diagram of a structure of a first synthesis network according to an embodiment of this application.

For example, FIG. 19 is a schematic diagram of a structure of a first synthesis network according to an embodiment of this application. As shown in FIG. 19, the first synthesis network can be invoked to generate an estimated value of a low-frequency sub-band signal, which is denoted as $$x'_{LB}(n),$$

based on an estimated value $$F'_{LB}(n)$$

of a feature vector of a low-frequency sub-band signal and a locally generated label information vector $E_{LB}(n)$ of a low-frequency part. For a specific calculation process, refer to the description in FIG. 14. Details are not described again in embodiments of this application. In addition, due to halving the sampling rate, FIG. 19 only provides a specific configuration of the first synthesis network corresponding to the low-frequency part. The implementation form of the high-frequency part is similar. Details are not repeated herewith again.

After this step, an estimated value $$x'_{LB}(n)$$

of the low-frequency sub-band signal and an estimated value $$x'_{HB}(n)$$

of the high-frequency sub-band signal are generated. In particular, acoustic interference such as noise in the two sub-band signals is effectively suppressed.

Finally, synthesis processing is performed by the QMF synthesis filter.

Based on the first two steps, after the estimated value $$x'_{LB}(n)$$

of the low-frequency sub-band signal and the estimated value $$x'_{HB}(n)$$

of the high-frequency sub-band signal are obtained at the decoder side, only upsampling and invoking the QMF synthesis filter are needed to generate a constructed signal having 320 points, that is, an estimated value x'(n) of the input signal x(n), to complete the entire decoding process.

Figure 20:
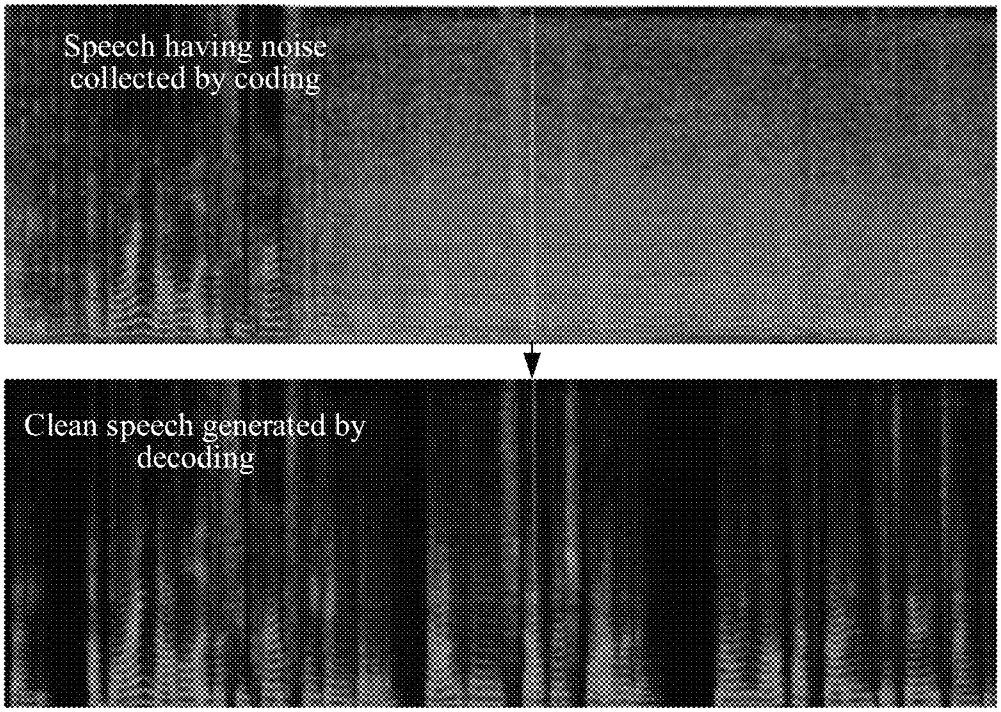
FIG. 20 is a schematic diagram of comparison between a coding effect and a decoding effect.

In summary, in embodiments of this application, an organic combination of signal decomposition and a related signal processing technology as well as a deep neural network enables coding efficiency to be significantly improved in comparison with a conventional signal processing solution. In a case that complexity is acceptable, speech enhancement is implemented at a decoder side, so that an effect of reconstructing clean speech can be achieved at a low bit rate under acoustic interference such as noise. For example, refer to FIG. 20. A speech signal collected at an encoder side is mixed with a large amount of noise interference. According to the speech enhancement and ultra-low bit rate compression solution provided in embodiments of this application, a clean speech signal can be reconstructed at a decoder side, thereby improving quality of a voice call.

The following continues to describe a structure of a software module which is an implementation of an audio decoding apparatus 565 provided in embodiments of this application. In some embodiments, as shown in FIG. 3, the software module in the audio decoding apparatus 565 stored in the memory 560 may include: an obtaining module 5651, a decoding module 5652, a label extraction module 5653, a reconstruction module 5654, and a determining module 5655.

The obtaining module 5651 is configured to obtain a bitstream of an audio signal. The bitstream may be obtained by coding the audio signal. The decoding module 5652 is configured to decode the bitstream to obtain a predicted value of a feature vector of the audio signal. The label extraction module 5653 is configured to perform label extraction processing on the predicted value of the feature vector to obtain a label information vector, a dimension of the label information vector being the same as a dimension of the predicted value of the feature vector. The reconstruction module 5654 is configured to perform signal reconstruction based on the predicted value of the feature vector and the label information vector. The determining module 5655 is configured to use a predicted value of the audio signal obtained by the signal reconstruction as a decoding result of the bitstream.

In some embodiments, the decoding module 5652 is further configured to decode the bitstream to obtain an index value of a feature vector of the audio signal; and query a quantization table based on the index value to obtain the predicted value of the feature vector of the audio signal.

In some embodiments, the label extraction module 5653 is further configured to perform convolution processing on the predicted value of the feature vector to obtain a first tensor having a same dimension as the predicted value of the feature vector; perform feature extraction processing on the first tensor to obtain a second tensor having a same dimension as the first tensor; perform full-connection processing on the second tensor to obtain a third tensor having a same dimension as the second tensor; and activate the third tensor to obtain the label information vector.

In some embodiments, the reconstruction module 5654 is further configured to splice the predicted value of the feature vector and the label information vector to obtain a spliced vector; and perform first convolution processing on the spliced vector to obtain a convolution feature of the audio signal; upsample the convolution feature to obtain an upsampled feature of the audio signal; perform pooling processing on the upsampled feature to obtain a pooled feature of the audio signal; and perform second convolution processing on the pooled feature to obtain the predicted value of the audio signal.

In some embodiments, the upsampling process is implemented by using a plurality of cascaded decoding layers, and sampling factors of different decoding layers are different. The reconstruction module 5654 is further configured to upsample the convolution feature by using the first decoding layer among the plurality of cascaded decoding layers; output an upsampling result of the first decoding layer to a subsequent cascaded decoding layer, and continuing the upsampling processing and the upsampling result output by using the subsequent cascaded decoding layer until the output reaches the last decoding layer; and use an upsampling result outputted by the last decoding layer as the upsampled feature of the audio signal.

In some embodiments, the bitstream includes a low-frequency bitstream and a high-frequency bitstream, the low-frequency bitstream being obtained by coding a low-frequency sub-band signal obtained by decomposing the audio signal, and the high-frequency bitstream being obtained by coding a high-frequency sub-band signal obtained by decomposing the audio signal. The decoding module 5652 is further configured to decode the low-frequency bitstream to obtain a predicted value of a feature vector of the low-frequency sub-band signal; and configured to decode the high-frequency bitstream to obtain a predicted value of a feature vector of the high-frequency sub-band signal.

In some embodiments, the label extraction module 5653 is further configured to perform label extraction processing on the predicted value of the feature vector of the low-frequency sub-band signal to obtain a first label information vector, a dimension of the first label information vector being the same as a dimension of the predicted value of the feature vector of the low-frequency sub-band signal; and configured to perform label extraction processing on the predicted value of the feature vector of the high-frequency sub-band signal to obtain a second label information vector, a dimension of the second label information vector being the same as a dimension of the predicted value of the feature vector of the high-frequency sub-band signal.

In some embodiments, the label extraction module 5653 is configured to invoke a first enhancement network to perform the following processing: performing convolution processing on the predicted value of the feature vector of the low-frequency sub-band signal to obtain a fourth tensor having a same dimension as the predicted value of the feature vector of the low-frequency sub-band signal; performing feature extraction processing on the fourth tensor to obtain a fifth tensor having a same dimension as the fourth tensor; performing full-connection processing on the fifth tensor to obtain a sixth tensor having a same dimension as the fifth tensor; and activating the sixth tensor to obtain the first label information vector.

In some embodiments, the label extraction module 5653 is further configured to invoke a second enhancement network to perform the following processing: performing convolution processing on the predicted value of the feature vector of the high-frequency sub-band signal to obtain a seventh tensor having a same dimension as the predicted value of the feature vector of the high-frequency sub-band signal; performing feature extraction processing on the seventh tensor to obtain an eighth tensor having a same dimension as the seventh tensor; performing full-connection processing on the eighth tensor to obtain a ninth tensor having a same dimension as the eighth tensor; and activating the ninth tensor to obtain the second label information vector.

In some embodiments, the predicted value of the feature vector includes: the predicted value of the feature vector of the low-frequency sub-band signal and the predicted value of the feature vector of the high-frequency sub-band signal. The reconstruction module 5654 is further configured to splice the predicted value of the feature vector of the low-frequency sub-band signal and the first label information vector to obtain a first spliced vector; invoke, based on the first spliced vector, a first synthesis network for signal reconstruction to obtain a predicted value of the low-frequency sub-band signal; splice the predicted value of the feature vector of the high-frequency sub-band signal and the second label information vector to obtain a second spliced vector; invoke, based on the second spliced vector, a second synthesis network for signal reconstruction to obtain a predicted value of the high-frequency sub-band signal; and synthesize the predicted value of the low-frequency sub-band signal and the predicted value of the high-frequency sub-band signal to obtain the predicted value of the audio signal.

In some embodiments, the reconstruction module 5654 is further configured to invoke a first synthesis network to perform the following processing: performing first convolution processing on the first spliced vector to obtain a convolution feature of the low-frequency sub-band signal; upsampling the convolution feature to obtain an upsampled feature of the low-frequency sub-band signal; performing pooling processing on the upsampled feature to obtain a pooled feature of the low-frequency sub-band signal; and performing second convolution processing on the pooled feature to obtain the predicted value of the low-frequency sub-band signal, the upsampling process being implemented by using a plurality of cascaded decoding layers, and sampling factors of different decoding layers being different.

In some embodiments, the reconstruction module 5654 is further configured to invoke a second synthesis network to perform the following processing: performing first convolution processing on the second spliced vector to obtain a convolution feature of the high-frequency sub-band signal; upsampling the convolution feature to obtain an upsampled feature of the high-frequency sub-band signal; performing pooling processing on the upsampled feature to obtain a pooled feature of the high-frequency sub-band signal; and performing second convolution processing on the pooled feature to obtain the predicted value of the high-frequency sub-band signal, the upsampling process being implemented by using a plurality of cascaded decoding layers, and sampling factors of different decoding layers being different.

In some embodiments, the bitstream includes N sub-bitstreams, the N sub-bitstreams corresponding to different frequency bands and being obtained by coding N sub-band signals obtained by decomposing the audio signal, and N being an integer greater than 2. The decoding module 5652 is further configured to decode the N sub-bitstreams respectively to obtain predicted values of feature vectors corresponding to the N sub-band signals, respectively.

In some embodiments, the label extraction module 5653 is further configured to perform label extraction processing on the predicted values of the feature vectors corresponding to the N sub-band signals respectively to obtain N label information vectors used for signal enhancement, a dimension of each label information vector being the same as a dimension of the predicted value of the feature vector of the corresponding sub-band signal.

In some embodiments, the label extraction module 5653 is further configured to invoke, based on a predicted value of a feature vector of an $i^{th}$ sub-band signal, an $i^{th}$ enhancement network for label extraction processing to obtain an $i^{th}$ label information vector, a value range of i satisfying that i is greater than or equal to 1 and is smaller than or equal to N, and a dimension of the $i^{th}$ label information vector being the same as a dimension of the predicted value of the feature vector of the $i^{th}$ sub-band signal.

In some embodiments, the label extraction module 5653 is further configured to invoke an $i^{th}$ enhancement network to perform the following processing: performing convolution processing on the predicted value of the feature vector of the $i^{th}$ sub-band signal to obtain a tenth tensor having a same dimension as the predicted value of the feature vector of the $i^{th}$ sub-band signal; performing feature extraction processing on the tenth tensor to obtain an eleventh tensor having a same dimension as the tenth tensor; performing full-connection processing on the eleventh tensor to obtain a twelfth tensor having a same dimension as the eleventh tensor; and activating the twelfth tensor to obtain the $i^{th}$ label information vector.

In some embodiments, the reconstruction module 5654 is further configured to splice the predicted values of the feature vectors corresponding to the N sub-band signals respectively and the N label information vectors one-to-one to obtain N spliced vectors; invoke, based on a $j^{th}$ spliced vector, a $j^{th}$ synthesis network for signal reconstruction to obtain a predicted value of a $j^{th}$ sub-band signal, a value range of j satisfying that j is greater than or equal to 1 and is smaller than or equal to N; and synthesize predicted values corresponding to the N sub-band signals respectively to obtain the predicted value of the audio signal.

In some embodiments, the reconstruction module 5654 is further configured to invoke a $j^{th}$ synthesis network to perform the following processing: performing first convolution processing on the $j^{th}$ spliced vector to obtain a convolution feature of the $j^{th}$ sub-band signal; upsampling the convolution feature to obtain an upsampled feature of the $j^{th}$ sub-band signal; performing pooling processing on the upsampled feature to obtain a pooled feature of the $j^{th}$ sub-band signal; and performing second convolution processing on the pooled feature to obtain the predicted value of the $j^{th}$ sub-band signal, the upsampling process being implemented by using a plurality of cascaded decoding layers, and sampling factors of different decoding layers being different.

The descriptions of the apparatus in embodiments of this application are similar to the foregoing descriptions of the method embodiment, and the apparatus embodiment has beneficial effects similar to those of the method embodiment, and therefore are not described in detail. Unexplained technical details of the audio decoding apparatus provided in embodiments of this application can be understood based on the description of any of the accompanying drawings in FIG. 4C, FIG. 6A, or FIG. 6B.

An embodiment of this application provides a computer program product or a computer program, the computer program product or the computer program including computer instructions, which are stored in a computer-readable storage medium. A processor of a computer device reads the computer instructions from the computer-readable storage medium. The processor executes the computer instructions to enable the computer device to execute the audio coding method and the audio decoding method according to embodiments of this application.

An embodiment of this application provides a computer-readable storage medium having computer-executable instructions stored thereon. The computer-executable instructions, when being executed by a processor, enable the processor to execute the audio coding method and the audio decoding method according to embodiments of this application, for example, the audio coding method and the audio decoding method shown in FIG. 4C.

In some embodiments, the computer-readable storage medium may be a memory such as an FRAM, a ROM, a PROM, an EPROM, an EEPROM, a flash memory, a magnetic memory, a compact disc, or a CD-ROM; or may be a variety of devices including one of the foregoing memories or any combination.

In some embodiments, the computer-executable instructions may be in the form of programs, software, software modules, scripts, or code, written in any form of programming language (which includes compiled or interpreted languages, or declarative or procedural languages), and may be deployed in any form, which includes being deployed as a standalone program or as a module, component, subroutine, or another unit suitable for use in a computing environment.

As an example, the executable instructions may, but do not necessarily, correspond to files in a file system, and may be stored in a part of the file for saving other programs or data, for example, stored in one or more scripts in a hypertext markup language (HTML) document, in a single file specifically used for the program of interest, or in a plurality of collaborative files (for example, files storing one or more modules, submodules, or code parts).

As an example, the executable instructions may be deployed to be executed on a single electronic device, or on a plurality of electronic devices located in a single location, or on a plurality of electronic devices distributed in a plurality of locations and interconnected through a communication network.

The foregoing descriptions are merely embodiments of this application and are not intended to limit the protection scope of this application. Any modification, equivalent replacement, or improvement made without departing from the spirit and scope of this application shall fall within the protection scope of this application.

What is claimed is:

1. An audio decoding method, executed by an electronic device, and comprising:
- obtaining a bitstream of an audio signal;
- performing label extraction processing on a predicted value of a feature vector of the audio signal associated with the bitstream to obtain a label information vector, comprising:
  - performing convolution processing on the predicted value of the feature vector to obtain a first tensor having a same dimension as the predicted value of the feature vector;
  - performing feature extraction processing on the first tensor to obtain a second tensor having a same dimension as the first tensor;
  - performing full-connection processing on the second tensor to obtain a third tensor having a same dimension as the second tensor; and
  - activating the third tensor to obtain the label information vector, a dimension of the label information vector being the same as a dimension of the predicted value of the feature vector;
- performing signal reconstruction based on the predicted value of the feature vector and the label information vector; and
- identifying a predicted value of the audio signal obtained by the signal reconstruction as a decoding result of the bitstream.

2. The method according to claim 1, wherein the performing signal reconstruction based on the predicted value of the feature vector and the label information vector comprises:
- splicing the predicted value of the feature vector and the label information vector to obtain a spliced vector; and
- compressing the spliced vector to obtain the predicted value of the audio signal.

3. The method according to claim 1, further comprising:
- decoding the bitstream to obtain an index value of the feature vector of the audio signal; and
- querying a quantization table based on the index value to obtain the predicted value of the feature vector of the audio signal.

4. The method according to claim 2, wherein the compressing the spliced vector to obtain the predicted value of the audio signal comprises:
- performing first convolution processing on the spliced vector to obtain a convolution feature of the audio signal;
- upsampling the convolution feature to obtain an upsampled feature of the audio signal;
- performing pooling processing on the upsampled feature to obtain a pooled feature of the audio signal; and performing second convolution processing on the pooled feature to obtain the predicted value of the audio signal.

5. The method according to claim 4, wherein the upsampling process uses a plurality of cascaded decoding layers, and sampling factors of different decoding layers are different; and the upsampling the convolution feature to obtain an upsampled feature of the audio signal comprises:

upsampling the convolution feature by using the first decoding layer among the plurality of cascaded decoding layers;

outputting an upsampling result of the first decoding layer to a subsequent cascaded decoding layer, and repeating upsampling processing and outputting upsampling result by using the subsequent cascaded decoding layer until an output reaches the last decoding layer; and identifying an upsampling result output by the last decoding layer as the upsampled feature of the audio signal.

6. The method according to claim 3, wherein the bitstream comprises a low-frequency bitstream and a high-frequency bitstream, the low-frequency bitstream being obtained by coding a low-frequency sub-band signal obtained by decomposing the audio signal, and the high-frequency bitstream being obtained by coding a high-frequency sub-band signal obtained by decomposing the audio signal; and the decoding the bitstream to obtain a predicted value of a feature vector of the audio signal comprises:

decoding the low-frequency bitstream to obtain a predicted value of a feature vector of the low-frequency sub-band signal; and decoding the high-frequency bitstream to obtain a predicted value of a feature vector of the high-frequency sub-band signal.

7. The method according to claim 6, wherein the performing label extraction processing on the predicted value of the feature vector to obtain a label information vector comprises:

performing label extraction processing on the predicted value of the feature vector of the low-frequency sub-band signal to obtain a first label information vector, a dimension of the first label information vector being the same as a dimension of the predicted value of the feature vector of the low-frequency sub-band signal; and performing label extraction processing on the predicted value of the feature vector of the high-frequency sub-band signal to obtain a second label information vector, a dimension of the second label information vector being the same as a dimension of the predicted value of the feature vector of the high-frequency sub-band signal.

8. The method according to claim 6, wherein the performing label extraction processing on the predicted value of the feature vector of the low-frequency sub-band signal to obtain a first label information vector comprises:

invoking a first enhancement network to perform the following processing:

performing convolution processing on the predicted value of the feature vector of the low-frequency sub-band signal to obtain a fourth tensor having a same dimension as the predicted value of the feature vector of the low-frequency sub-band signal;

performing feature extraction processing on the fourth tensor to obtain a fifth tensor having a same dimension as the fourth tensor;

performing full-connection processing on the fifth tensor to obtain a sixth tensor having a same dimension as the fifth tensor; and activating the sixth tensor to obtain the first label information vector.

9. The method according to claim 6, wherein the performing label extraction processing on the predicted value of the feature vector of the high-frequency sub-band signal to obtain a second label information vector comprises:

invoking a second enhancement network to perform the following processing:

performing convolution processing on the predicted value of the feature vector of the high-frequency sub-band signal to obtain a seventh tensor having a same dimension as the predicted value of the feature vector of the high-frequency sub-band signal;

performing feature extraction processing on the seventh tensor to obtain an eighth tensor having a same dimension as the seventh tensor;

performing full-connection processing on the eighth tensor to obtain a ninth tensor having a same dimension as the eighth tensor; and activating the ninth tensor to obtain the second label information vector.

10. The method according to claim 7, wherein the predicted value of the feature vector comprises: the predicted value of the feature vector of the low-frequency sub-band signal and the predicted value of the feature vector of the high-frequency sub-band signal; and the performing signal reconstruction based on the predicted value of the feature vector and the label information vector comprises:

splicing the predicted value of the feature vector of the low-frequency sub-band signal and the first label information vector to obtain a first spliced vector;

invoking, based on the first spliced vector, a first synthesis network for signal reconstruction to obtain a predicted value of the low-frequency sub-band signal;

splicing the predicted value of the feature vector of the high-frequency sub-band signal and the second label information vector to obtain a second spliced vector;

invoking, based on the second spliced vector, a second synthesis network for signal reconstruction to obtain a predicted value of the high-frequency sub-band signal; and synthesizing the predicted value of the low-frequency sub-band signal and the predicted value of the high-frequency sub-band signal to obtain the predicted value of the audio signal.

11. The method according to claim 10, wherein the invoking, based on the first spliced vector, a first synthesis network for signal reconstruction to obtain a predicted value of the low-frequency sub-band signal comprises:

invoking the first synthesis network to perform the following processing:

performing first convolution processing on the first spliced vector to obtain a convolution feature of the low-frequency sub-band signal;

upsampling the convolution feature to obtain an upsampled feature of the low-frequency sub-band signal;

performing pooling processing on the upsampled feature to obtain a pooled feature of the low-frequency sub-band signal; and performing second convolution processing on the pooled feature to obtain the predicted value of the low-frequency sub-band signal, the upsampling process being implemented by using a plurality of cascaded decoding layers, and sampling factors of different decoding layers being different.

12. The method according to claim 10, wherein the invoking, based on the second spliced vector, a second synthesis network for signal reconstruction to obtain a predicted value of the high-frequency sub-band signal comprises:

invoking the second synthesis network to perform the following processing:

performing first convolution processing on the second spliced vector to obtain a convolution feature of the high-frequency sub-band signal;

upsampling the convolution feature to obtain an upsampled feature of the high-frequency sub-band signal;

performing pooling processing on the upsampled feature to obtain a pooled feature of the high-frequency sub-band signal; and performing second convolution processing on the pooled feature to obtain the predicted value of the high-frequency sub-band signal, the upsampling process being implemented by using the plurality of cascaded decoding layers, and sampling factors of different decoding layers being different.

13. The method according to claim 3, wherein the bitstream comprises N sub-bitstreams, the N sub-bitstreams corresponding to different frequency bands and being obtained by coding N sub-band signals obtained by decomposing the audio signal, and N being an integer greater than 2; and the decoding the bitstream to obtain a predicted value of a feature vector of the audio signal comprises:

decoding the N sub-bitstreams respectively to obtain predicted values of feature vectors corresponding to the N sub-band signals, respectively.

14. The method according to claim 13, wherein the performing label extraction processing on the predicted value of the feature vector to obtain a label information vector comprises:

performing label extraction processing on the predicted values of the feature vectors corresponding to the N sub-band signals respectively to obtain N label information vectors, a dimension of each label information vector being the same as a dimension of the predicted value of the feature vector corresponding to the sub-band signal.

15. The method according to claim 14, wherein the performing label extraction processing on the predicted values of the feature vectors corresponding to the N sub-band signals respectively to obtain N label information vectors comprises:

invoking, based on a predicted value of a feature vector of an $i^{th}$ sub-band signal, an $i^{th}$ enhancement network for label extraction processing to obtain an $i^{th}$ label information vector, a value range of i satisfying that i is greater than or equal to 1 and is smaller than or equal to N, and a dimension of the $i^{th}$ label information vector being the same as a dimension of the predicted value of the feature vector of the $i^{th}$ sub-band signal.

16. The method according to claim 15, wherein the invoking, based on a predicted value of a feature vector of an $i^{th}$ sub-band signal, an $i^{th}$ enhancement network for label extraction processing to obtain an $i^{th}$ label information vector comprises:

invoking the $i^{th}$ enhancement network to perform the following processing:

performing convolution processing on the predicted value of the feature vector of the $i^{th}$ sub-band signal to obtain a tenth tensor having a same dimension as the predicted value of the feature vector of the $i^{th}$ sub-band signal;

performing feature extraction processing on the tenth tensor to obtain an eleventh tensor having a same dimension as the tenth tensor;

performing full-connection processing on the eleventh tensor to obtain a twelfth tensor having a same dimension as the eleventh tensor; and activating the twelfth tensor to obtain the $i^{th}$ label information vector.

17. The method according to claim 14, wherein the performing signal reconstruction based on the predicted value of the feature vector and the label information vector comprises:

splicing the predicted values of the feature vectors corresponding to the N sub-band signals respectively and the N label information vectors one-to-one to obtain N spliced vectors;

invoking, based on a $j^{th}$ spliced vector, a $j^{th}$ synthesis network for signal reconstruction to obtain a predicted value of a $j^{th}$ sub-band signal, a value range of j satisfying that j is greater than or equal to 1 and is smaller than or equal to N;

performing first convolution processing on the $j^{th}$ spliced vector to obtain a convolution feature of the $j^{th}$ sub-band signal;

upsampling the convolution feature to obtain an upsampled feature of the $j^{th}$ sub-band signal;

performing pooling processing on the upsampled feature to obtain a pooled feature of the $j^{th}$ sub-band signal; and performing second convolution processing on the pooled feature to obtain the predicted value of the $j^{th}$ sub-band signal, the upsampling process being implemented by using the plurality of cascaded decoding layers, and sampling factors of different decoding layers being different; and synthesizing predicted values corresponding to the N sub-band signals respectively to obtain the predicted value of the audio signal.

18. An electronic device, comprising:

a memory, configured to store computer-executable instructions; and a processor, configured, when executing the computer-executable instructions stored in the memory, to implement:

obtaining a bitstream of an audio signal;

performing label extraction processing on a predicted value of a feature vector of the audio signal associated with the bitstream to obtain a label information vector, comprising:

performing convolution processing on the predicted value of the feature vector to obtain a first tensor having a same dimension as the predicted value of the feature vector;

performing feature extraction processing on the first tensor to obtain a second tensor having a same dimension as the first tensor;

performing full-connection processing on the second tensor to obtain a third tensor having a same dimension as the second tensor; and activating the third tensor to obtain the label information vector, a dimension of the label information vector being the same as a dimension of the predicted value of the feature vector;

performing signal reconstruction based on the predicted value of the feature vector and the label information vector; and identifying a predicted value of the audio signal obtained by the signal reconstruction as a decoding result of the bitstream.

19. A non-transitory computer-readable storage medium, having computer-executable instructions stored thereon, the computer-executable instructions, when being executed by a processor, causing the processor to implement:

obtaining a bitstream of an audio signal;

performing label extraction processing on a predicted value of a feature vector of the audio signal associated with the bitstream to obtain a label information vector, comprising:

performing convolution processing on the predicted value of the feature vector to obtain a first tensor having a same dimension as the predicted value of the feature vector;

performing feature extraction processing on the first tensor to obtain a second tensor having a same dimension as the first tensor;

performing full-connection processing on the second tensor to obtain a third tensor having a same dimension as the second tensor; and activating the third tensor to obtain the label information vector, a dimension of the label information vector being the same as a dimension of the predicted value of the feature vector;

performing signal reconstruction based on the predicted value of the feature vector and the label information vector; and identifying a predicted value of the audio signal obtained by the signal reconstruction as a decoding result of the bitstream.

* * * * *